US012250517B2

(12) United States Patent
Fukui et al.

(10) Patent No.: US 12,250,517 B2
(45) Date of Patent: *Mar. 11, 2025

(54) SOUND SYSTEM

(71) Applicant: NIPPON TELEGRAPH AND TELEPHONE CORPORATION, Tokyo (JP)

(72) Inventors: Masahiro Fukui, Tokyo (JP); Kazunori Kobayashi, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 199 days.

This patent is subject to a terminal disclaimer.

(21) Appl. No.: 17/912,850

(22) PCT Filed: Mar. 26, 2020

(86) PCT No.: PCT/JP2020/013764

§ 371 (c)(1),
(2) Date: Sep. 19, 2022

(87) PCT Pub. No.: WO2021/192166

PCT Pub. Date: Sep. 30, 2021

(65) Prior Publication Data

US 2023/0188889 A1 Jun. 15, 2023

(51) Int. Cl.
*H04R 1/40* (2006.01)
*G10K 11/178* (2006.01)
(Continued)

(52) U.S. Cl.
CPC ....... *H04R 1/403* (2013.01); *G10K 11/17857* (2018.01); *H04R 3/12* (2013.01); *G10K 2210/1281* (2013.01); *H04R 2499/13* (2013.01)

(58) Field of Classification Search
None
See application file for complete search history.

(56) References Cited

U.S. PATENT DOCUMENTS

| | | | |
|---|---|---|---|
| 11,159,886 | B2 | 10/2021 | Hayashi et al. |
| 2007/0183617 | A1 | 8/2007 | Yokota et al. |

(Continued)

FOREIGN PATENT DOCUMENTS

| | | | |
|---|---|---|---|
| JP | S61-188243 A | 8/1986 | |
| JP | H0851698 A | 2/1996 | |

(Continued)

OTHER PUBLICATIONS

Inflight Entertainment / JAL First Class, [online], [retrieved on Mar. 10, 2020], Internet <URL: https://www.jal.co.jp/jp/ia/inter/service/first/entertainment/index.html> with its English version.

*Primary Examiner* — Qin Zhu

(57) ABSTRACT

A sound system, for a user using a seat of an aircraft, an automobile, or the like, that reproduces sound inaudible to users around, without using earphones or headphones, is provided. A sound system for a user using a seat of an aircraft includes: a reproduction apparatus including an n-th reproduction unit (n=1, . . . , N) that outputs a (2n−1)-th sound signal that is a sound signal obtained based on a subject to be reproduced, and a 2n-th sound signal that is a sound signal with opposite phase to phase of the (2n−1)-th sound signal, N being an integer equal to or larger than one; and a speaker system including an n-th speaker unit pair (n=1, . . . , N) including a speaker unit that emits sound based on the (2n−1)-th sound signal (hereinafter, referred to as the positive speaker unit) and a speaker unit that emits sound based on the 2n-th sound signal (hereinafter, referred to as the negative speaker unit), the speaker system being installed at a place close to a head of the user using the seat.

14 Claims, 22 Drawing Sheets

(51) Int. Cl.

| | |
|---|---|
| ***H04R 3/12*** | (2006.01) |
| ***H04R 5/02*** | (2006.01) |

(56) References Cited

U.S. PATENT DOCUMENTS

| | | | | |
|---|---|---|---|---|
| 2009/0175463 | A1* | 7/2009 | Lee | H04R 3/005<br>381/72 |
| 2014/0233747 | A1 | 8/2014 | Fox | |
| 2019/0182593 | A1 | 6/2019 | Guerrini et al. | |
| 2020/0374631 | A1* | 11/2020 | Hayashi | H04R 1/025 |
| 2021/0168504 | A1* | 6/2021 | Corynen | H04R 1/403 |
| 2021/0208839 | A1* | 7/2021 | Yamamoto | G10K 11/175 |

FOREIGN PATENT DOCUMENTS

| | | | |
|---|---|---|---|
| WO | 2019/139103 | A1 | 7/2019 |
| WO | 2019192808 | A1 | 10/2019 |

* cited by examiner

SOUND SYSTEM

CROSS-REFERENCE TO RELATED APPLICATIONS

This application is a U.S. National Stage Application filed under 35 U.S.C. § 371 claiming priority to International Patent Application No. PCT/JP2020/013764, filed on 26 Mar. 2020, the disclosure of which is hereby incorporated herein by reference in its entirety.

TECHNICAL FIELD

The present invention relates to a sound reproduction technology that can be used for an audio system installed in a seat of an aircraft, an automobile, or the like.

BACKGROUND ART

Conventionally, users have used earphones or headphones to view a movie or listen to music in an aircraft (see Non-Patent Literature 1). This is because if a speaker is used, reproduced sound reaches surroundings of a user and becomes a nuisance to other users.

CITATION LIST

Non-Patent Literature

Non-Patent Literature 1: Inflight Entertainment/JAL First Class, [online], [retrieved on Mar. 10, 2020], Internet <URL: https://www.jal.co.jp/jp/ja/inter/service/first/entertain ment/index.html>

SUMMARY OF THE INVENTION

Technical Problem

However, wearing earphones or headphones makes users uncomfortable. Moreover, some users do not like wearing such devices because hairstyles become untidy. There are also some users who dislike pressure on ears caused by wearing the devices. Further, a long period of wearing earphones or headphones may make users tired of hearing in some cases.

To make it unnecessary to wear earphones or headphones, it is conceivable that a virtual sound field is synthesized by using a wave field synthesis technology, in which case, however, a large-scale speaker array needs to be prepared, and such a method is therefore is not practical.

Accordingly, an object of the present invention is to provide a sound system, for a user using a seat of an aircraft, an automobile, or the like, that reproduces sound inaudible to users around, without using earphones or headphones.

Means for Solving the Problem

An aspect of the present invention is a sound system for a user using a seat of an aircraft, including: a reproduction apparatus including an n-th reproduction unit (n=1, . . . , N) that outputs a (2n−1)-th sound signal that is a sound signal obtained based on a subject to be reproduced, and a 2n-th sound signal that is a sound signal with opposite phase to phase of the (2n−1)-th sound signal, N being an integer equal to or larger than one; and a speaker system including an n-th speaker unit pair (n=1, . . . , N) including a speaker unit that emits sound based on the (2n−1)-th sound signal (hereinafter, referred to as the positive speaker unit) and a speaker unit that emits sound based on the 2n-th sound signal (hereinafter, referred to as the negative speaker unit), the speaker system being installed at a place close to a head of the user using the seat, wherein assuming that a direction in which the n-th speaker unit pair faces the user is an n-th user direction (n=1, . . . , N), sound emitted from the positive speaker unit of the n-th speaker unit pair in the n-th user direction and sound emitted from the positive speaker unit of the n-th speaker unit pair in an opposite direction to the n-th user direction are in an antiphase relationship with each other, and sound emitted from the negative speaker unit of the n-th speaker unit pair in the n-th user direction and sound emitted from the negative speaker unit of the n-th speaker unit pair in the opposite direction to the n-th user direction are in an antiphase relationship with each other.

An aspect of the present invention is a sound system for a user using a seat of an aircraft, including: a reproduction apparatus including an n-th reproduction unit (n=1, . . . , N) that outputs a (2n−1)-th sound signal that is a sound signal obtained based on a subject to be reproduced, and a 2n-th sound signal that is a sound signal with opposite phase to phase of the (2n−1)-th sound signal, N being an integer equal to or larger than one; a band division apparatus including an n-th band division unit (n=1, . . . , N) that generates, from the (2n−1)-th sound signal, a (2n−1)-th high-frequency signal that is a signal at high frequencies and a (2n−1)-th low-frequency signal that is a signal at low frequencies, and generates, from the 2n-th sound signal, a 2n-th high-frequency signal that is a signal at high frequencies and a 2n-th low-frequency signal that is a signal at low frequencies; and a speaker system including an n-th speaker unit pair (n=1, . . . , N) including a speaker unit that emits sound based on the (2n−1)-th low-frequency signal (hereinafter, referred to as the positive speaker unit), a tweeter that is added to the positive speaker unit and emits sound based on the (2n−1)-th high-frequency signal, a speaker unit that emits sound based on the 2n-th low-frequency signal (hereinafter, referred to as the negative speaker unit), and a tweeter that is added to the negative speaker unit and emits sound based on the 2n-th high-frequency signal, the speaker system being installed at a place close to a head of the user using the seat.

An aspect of the present invention is a sound system for a user using a seat of an aircraft, including: a reproduction apparatus including an n-th reproduction unit (n=1, . . . , N) that outputs a (2n−1)-th sound signal that is a sound signal obtained based on a subject to be reproduced, and a 2n-th sound signal that is a sound signal with opposite phase to phase of the (2n−1)-th sound signal, N being an integer equal to or larger than one; a band division apparatus including an n-th band division unit (n=1, . . . , N) that generates, from the (2n−1)-th sound signal, a (2n−1)-th high-frequency signal that is a signal at high frequencies and a (2n−1)-th low-frequency signal that is a signal at low frequencies, and generates, from the 2n-th sound signal, a 2n-th low-frequency signal that is a signal at low frequencies; and a speaker system including an n-th speaker unit pair (n=1, . . . , N) including a speaker unit that emits sound based on the (2n−1)-th low-frequency signal (hereinafter, referred to as the positive speaker unit), a tweeter that is housed in a speaker box and emits sound based on the (2n−1)-th high-frequency signal, and a speaker unit that emits sound based on the 2n-th low-frequency signal (hereinafter, referred to as the negative speaker unit), the speaker system being installed at a place close to a head of the user using the seat.

Effects of the Invention

According to the present invention, it is possible to reproduce sound that can be heard only in a very limited small area.

DESCRIPTION OF EMBODIMENTS

Hereinafter, embodiments of the present invention will be described in detail. Note that components having the same functions are denoted by the same reference signs, and an overlapping description is omitted.

TECHNICAL BACKGROUND

First, directivity of sound emitted from a speaker is described. Next, directivity of sound emitted from a speaker unit pair according to the invention of the present application is described. Lastly, results of an experiment for confirming effects of the speaker unit pair according to the invention of the present application are described.

<<1: Directivity of Sound Emitted from Speaker>>

Generally, a speaker includes a speaker unit and a speaker box. The speaker unit is a component including a diaphragm that converts a sound signal, which is an electrical signal, into aerial vibration (that is, generates sound waves). The speaker box is a component that houses the speaker unit.

Figure 1:
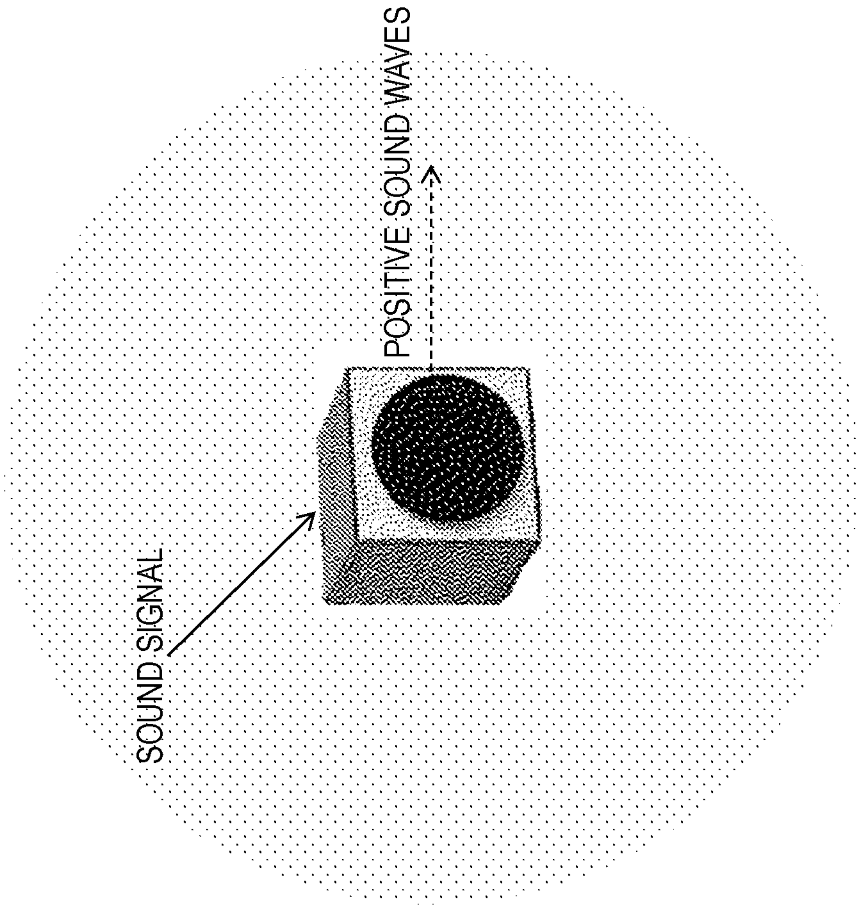
FIG. 1 is a view for describing directivity of sound emitted from a speaker.

When a sound signal is inputted into the speaker, the diaphragm of the speaker unit vibrates, and sound waves are emitted in both directions in which the diaphragm vibrates. Here, a sound wave emitted to the outside of the speaker box (that is, in a direction toward the front of the speaker unit) is referred to as positive sound wave, and a sound wave emitted to the inside of the speaker box (that is, in a direction toward the rear of the speaker unit) is referred to as negative sound wave. The negative sound wave is a sound wave with opposite phase to phase of the positive sound wave. FIG. 1 is a view for describing directivity of sound emitted from the speaker. As shown in FIG. 1, while positive sound waves are emitted from the speaker in all directions, negative sound waves do not go out of the speaker box. As a result, the sound emitted from the speaker is heard in a wide area.

<<2: Directivity of Sound Emitted from Speaker Unit Pair>>

Figure 2:
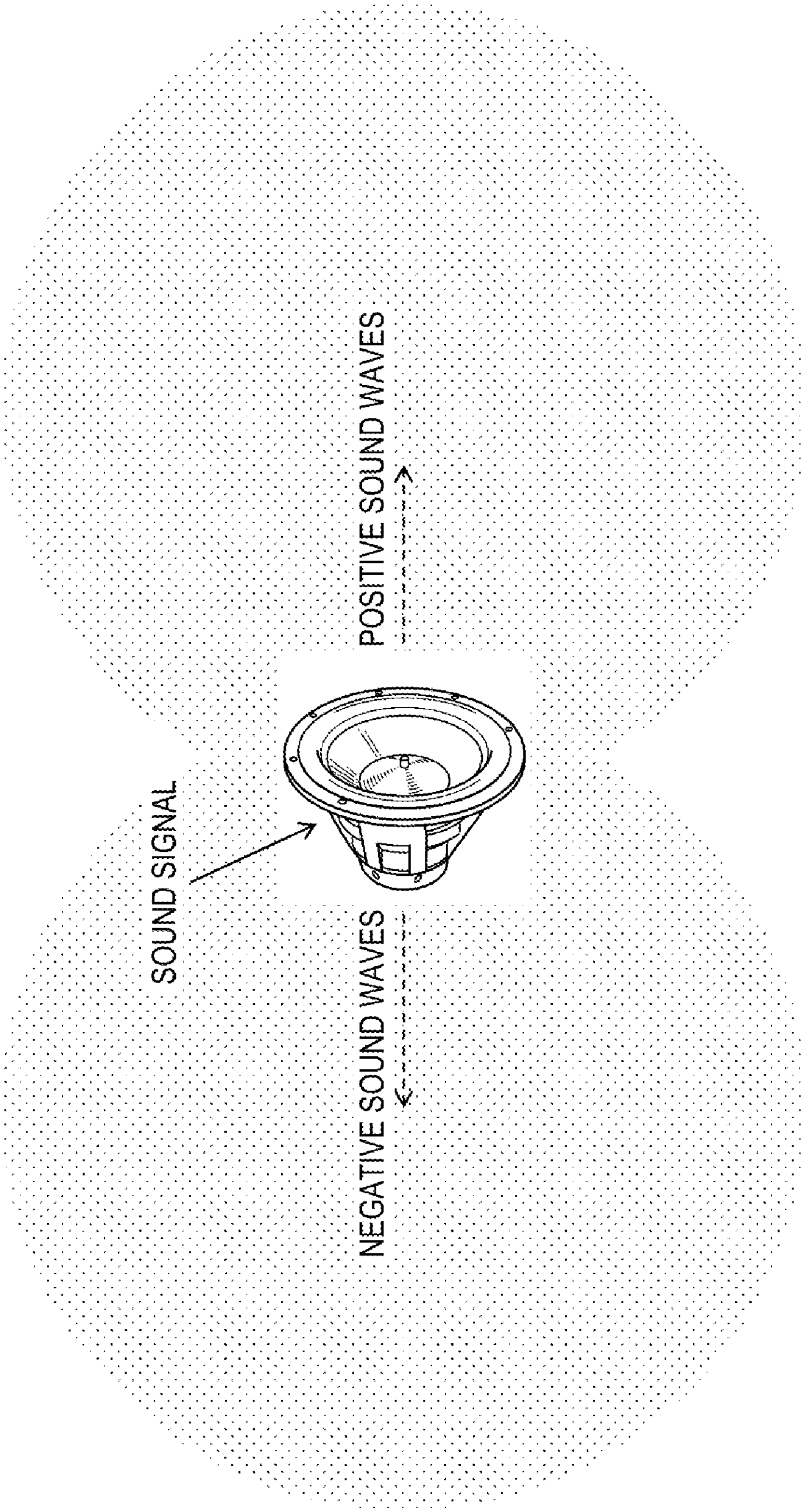
FIG. 2 is a view for describing directivity of sound emitted from a speaker unit.

Here, first, a description will be given of directivity of sound emitted from a speaker unit, which is a bare speaker. FIG. 2 is a view for describing the directivity of sound emitted from the speaker unit. In a case of only the speaker unit, unlike the case of the speaker, negative sound waves are emitted from the rear of the speaker unit, which is hidden in the speaker box in the case of the speaker. Accordingly, sound emitted from the speaker unit has a characteristic of bi-directivity as shown in FIG. 2.

Figure 3:
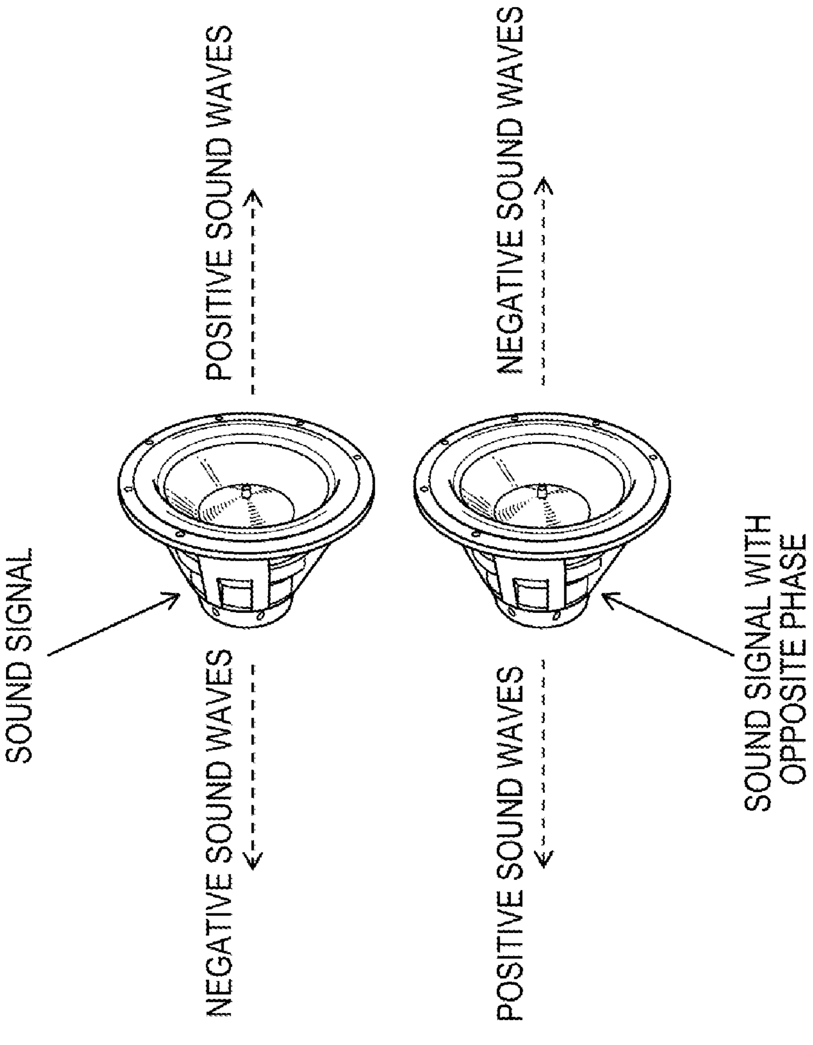
FIG. 3 is a view for describing sound emitted from a speaker unit pair.
Figure 4:
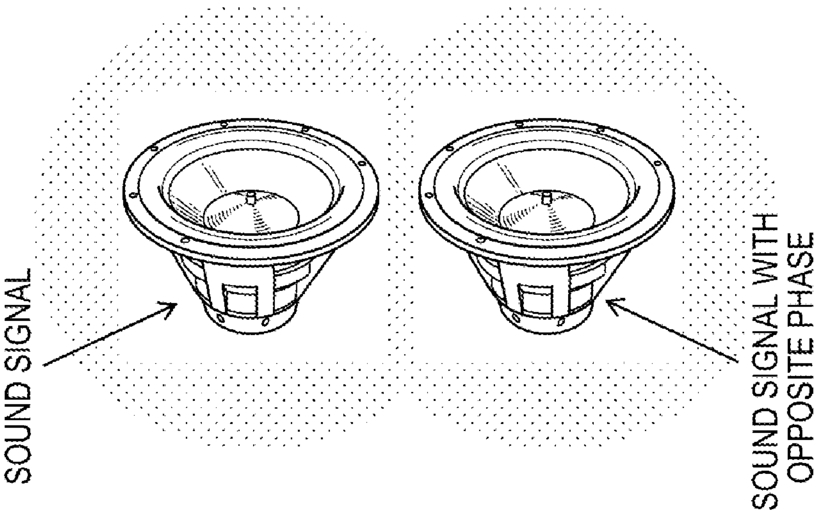
FIG. 4 is a view for describing directivity of sound emitted from a speaker unit pair.

In the invention of the present application, such bi-directivity is utilized. A specific description will be given below. First, a speaker unit pair is created by arranging two speaker units side by side as in FIG. 3. When sound signals having an opposite relationship in positive and negative terms are inputted into the speaker unit pair, respectively, respective diaphragms of the two speaker units vibrate and emit sound based on the two sound signals, respectively. Then, as shown in FIG. 4, the sound in all directions is canceled, except in the vicinity of the speaker unit pair. In other words, the sound is canceled only at sufficiently distant places from the speaker unit pair, and the sound is not canceled in the vicinity of the speaker unit pair. The reason why the sound is not canceled in the vicinity of the speaker unit pair is that phases of sound waves emitted from the front of the speaker units and phases of sound waves bending around from the rear do not coincide in the vicinity of the speaker unit pair.

In other words, by utilizing a nature that sound is heard only in the vicinity of the speaker unit pair when a predetermined sound signal is inputted into one of the speaker units included in the speaker unit pair and a sound signal with opposite phase to that of the predetermined sound signal is inputted into the other speaker unit, a situation can be created in which only a user who is present in the vicinity of the speaker unit pair can hear the sound, and other users cannot hear the sound.

<<3: Results of Experiment>>

Figure 5:
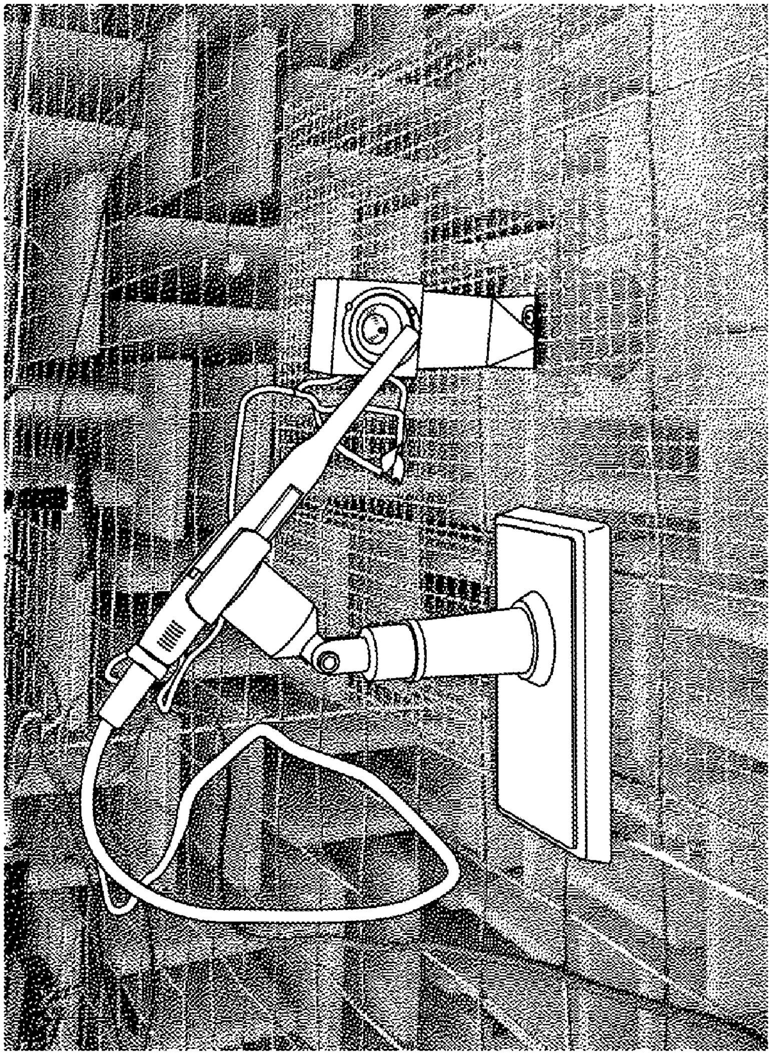
FIG. 5 shows an aspect of an experiment (positional relationship between a speaker and a microphone).
Figure 6:
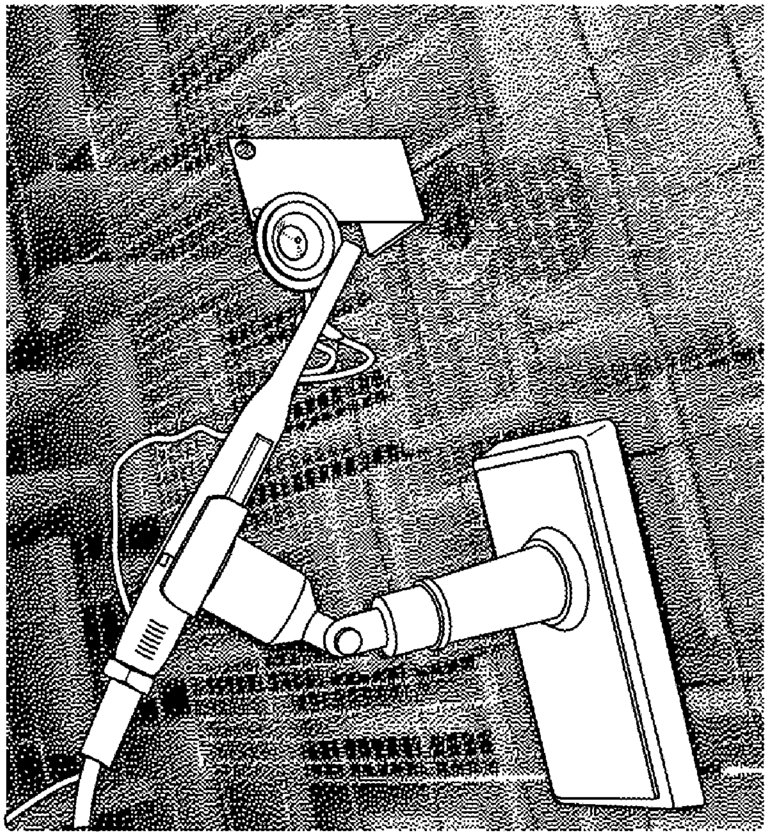
FIG. 6 shows an aspect of the experiment (positional relationship between a speaker unit and a microphone).
Figure 7:
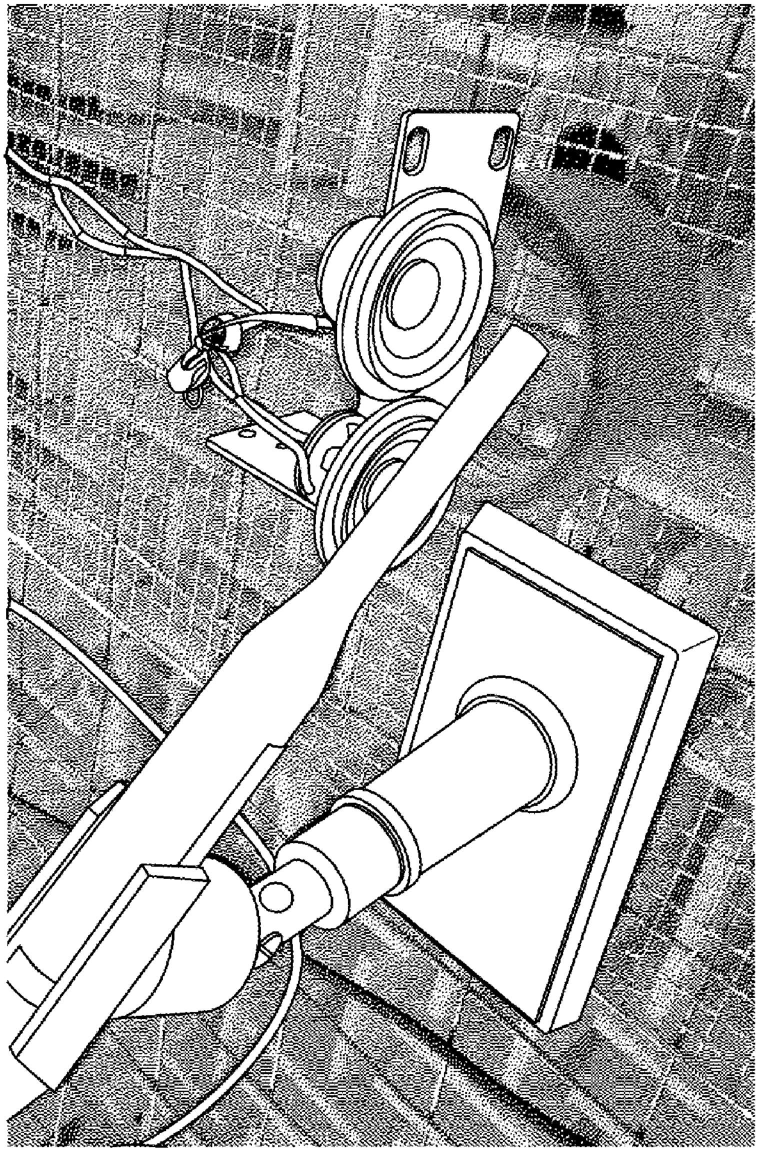
FIG. 7 shows an aspect of the experiment (positional relationship between a speaker unit pair and a microphone).

Here, a description will be given of results of an experiment of measuring frequency characteristics of the speaker, the speaker unit, and the speaker unit pair. In the experiment, for the speaker, the speaker unit, and the speaker unit pair, a speaker including a diaphragm with a diameter of 4.5 cm (see FIG. 5), a speaker unit obtained by removing a speaker box from the speaker (see FIG. 6), and a pair of such speaker units arranged side by side (see FIG. 7) are used, respectively. Moreover, to measure frequency characteristics in the vicinity of each of the speaker, the speaker unit, and the speaker unit pair, a microphone is placed under four conditions as follows.

Figure 8:
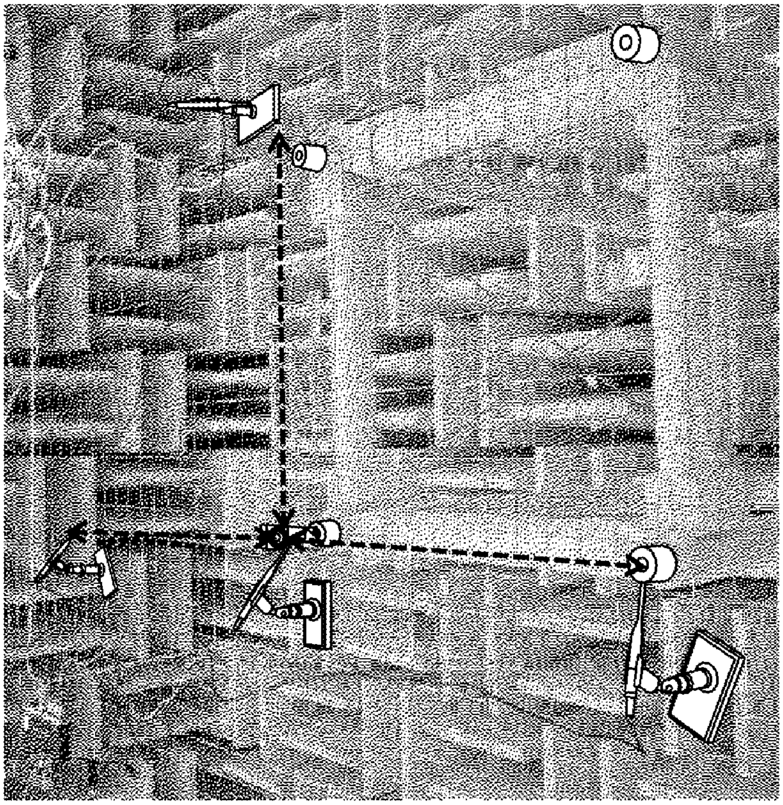
FIG. 8 shows an aspect of the experiment (other measurement positions).
Figure 9:
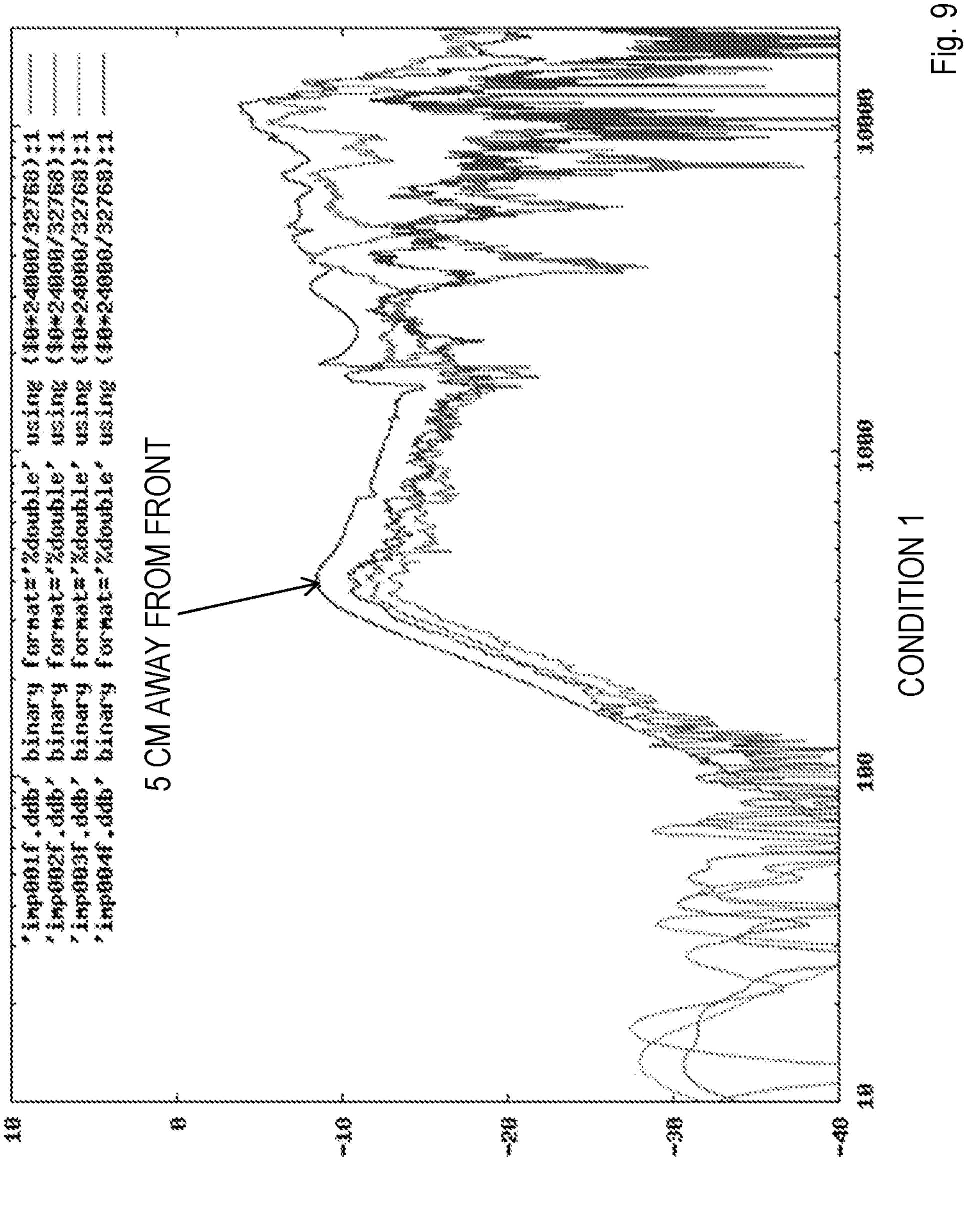
FIG. 9 shows results of the experiment (condition 1).
Figure 10:
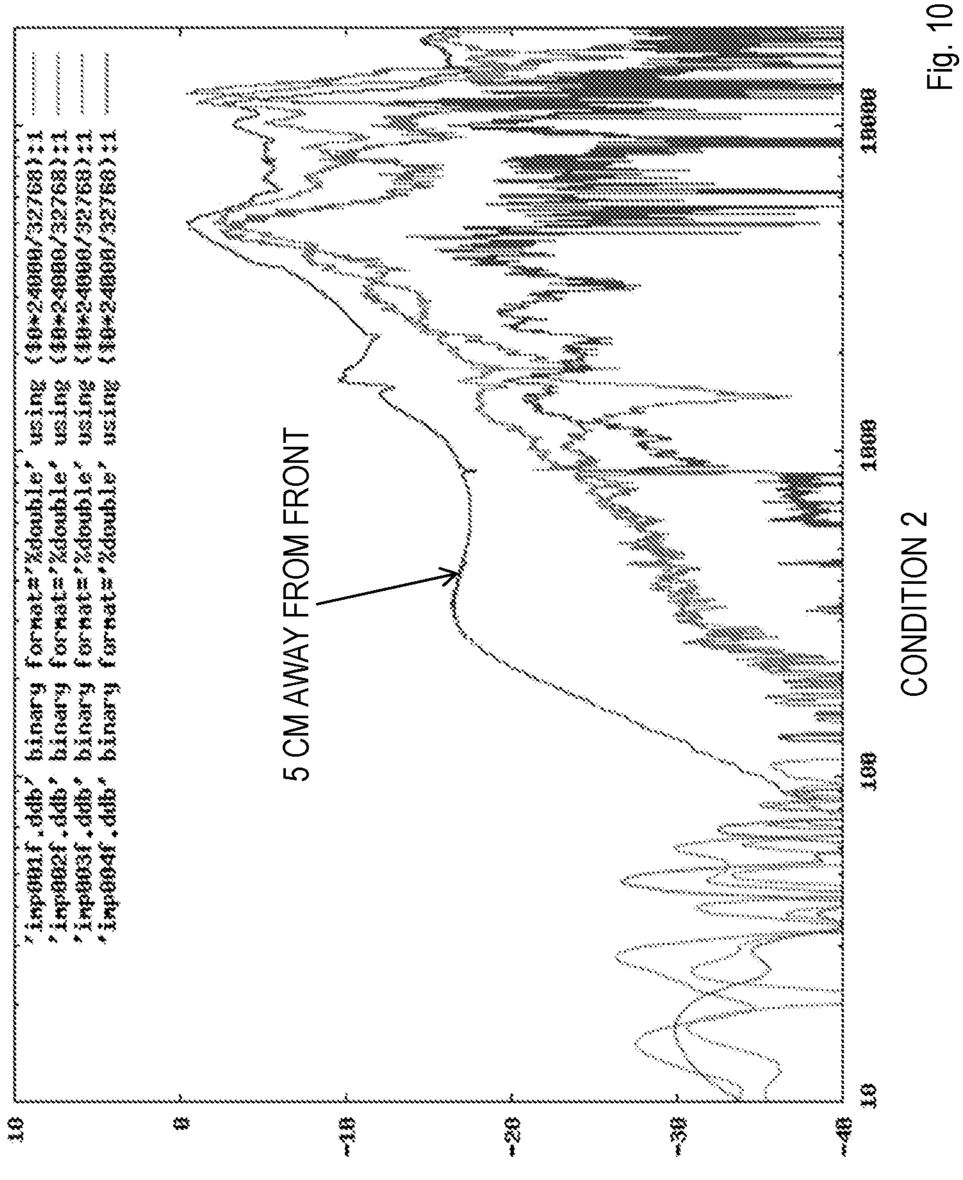
FIG. 10 shows results of the experiment (condition 2).
Figure 11:
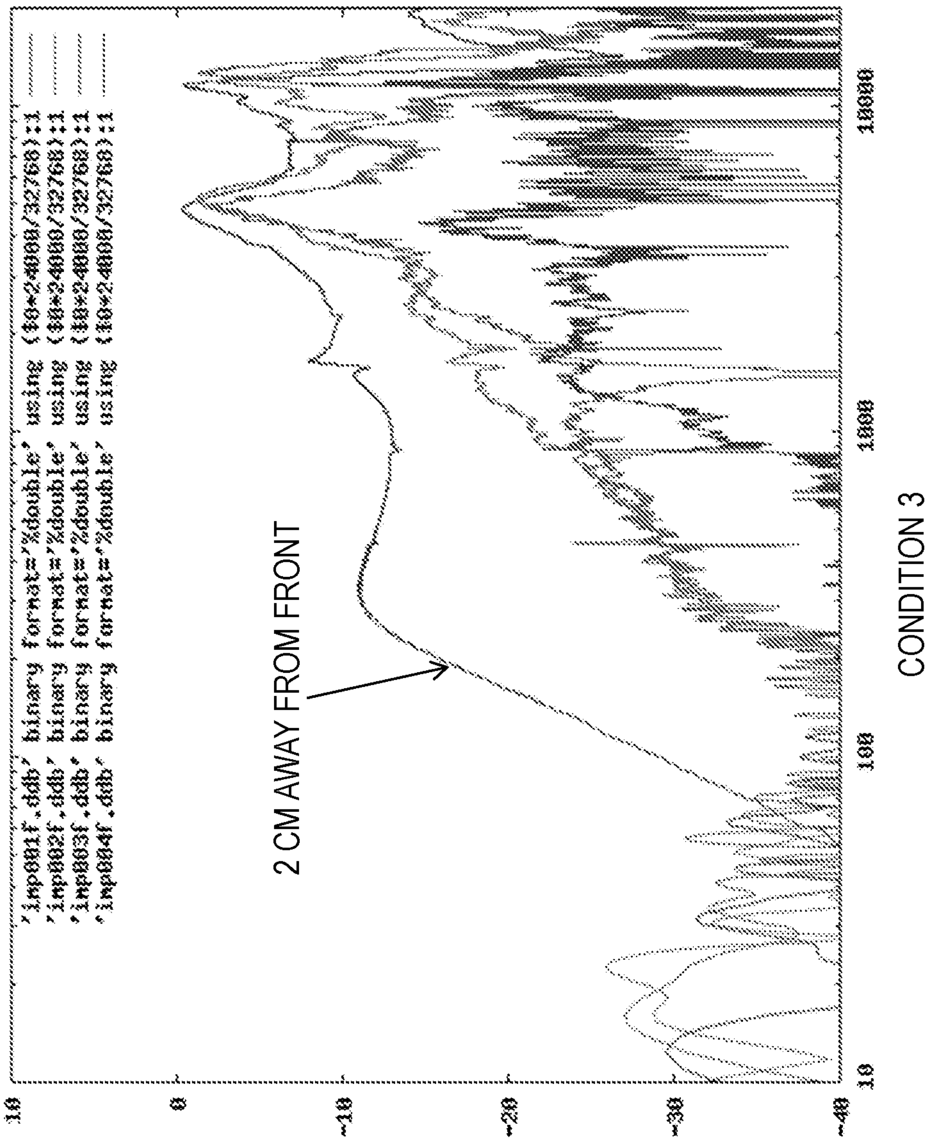
FIG. 11 shows results of the experiment (condition 3).
Figure 12:
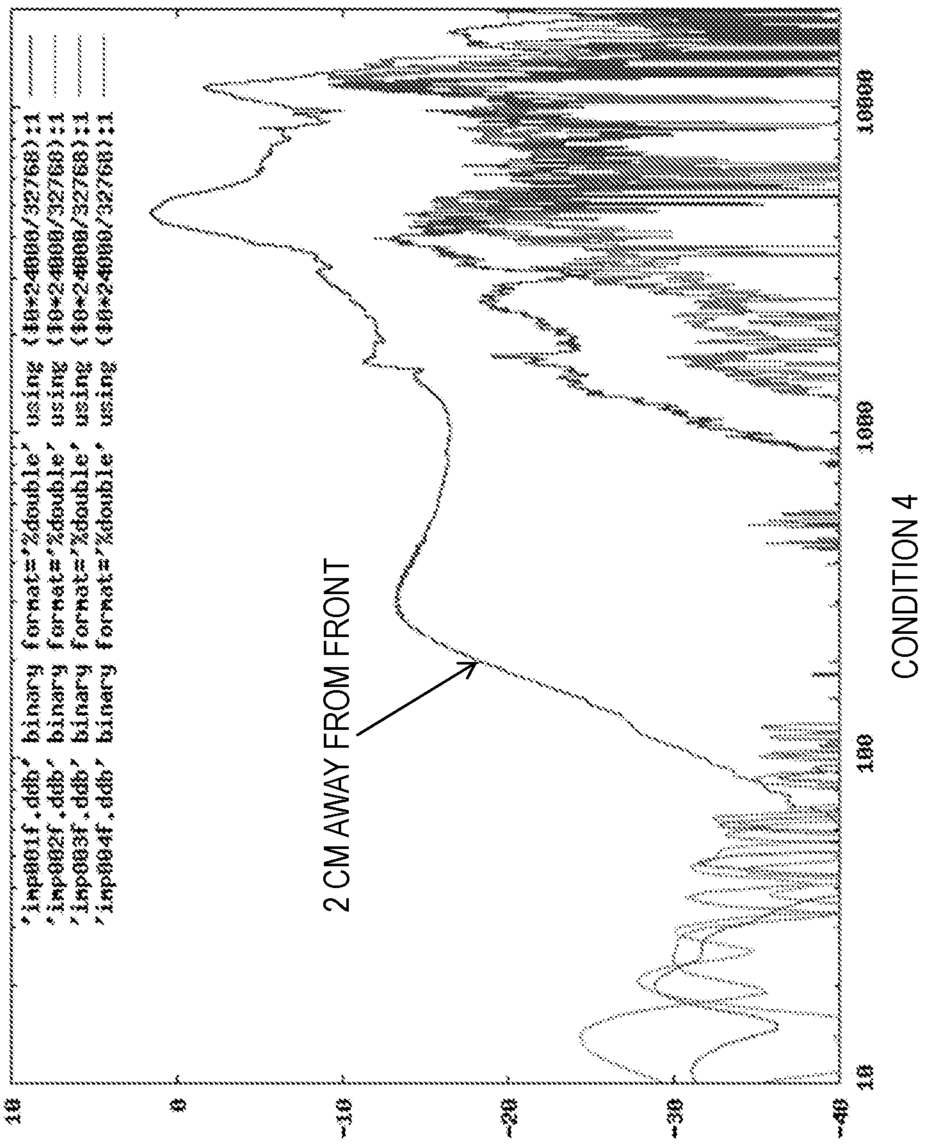
FIG. 12 shows results of the experiment (condition 4).

(Condition 1) At a position 5 cm away from the front of the speaker (Condition 2) At a position 5 cm away from the front of the speaker unit (Condition 3) At a position 2 cm away from the front of the speaker unit (Condition 4) At a position 2 cm away from the front of the speaker unit pair Moreover, for comparison, a microphone is also placed at a position 100 cm away from each of the front, the rear, and a side of the speaker, the speaker unit, or the speaker unit pair, under each of the conditions (see FIG. 8).

Hereinafter, results of the experiment will be described. FIGS. 9, 10, 11, and 12 are diagrams showing results of the experiment, and are diagrams showing relationships between frequency and attenuation under the conditions 1, 2, 3, and 4, respectively. Each of the diagrams shows four curves, of which the curve indicated by an arrow corresponds to sound picked up by the microphone positioned 5 cm or 2 cm away from the front, and the other three curves correspond to sound picked up by the microphones positioned 100 cm away from the front, the rear, and the side. Note that the curve corresponding to the position 5 cm or 2 cm away from the front presents extremely high gain because the position is in the vicinity of the speaker or the like. Accordingly, to facilitate visualization, the curve corresponding to the position 5 cm away from the front is plotted by reducing the gain by 25 dB compared to the three curves corresponding to the positions 100 cm away. Similarly, the curve corresponding to the position 2 cm away from the front is plotted by reducing the gain by 32 dB. On comparison between FIGS. 9 and 10, it can be seen that while there is little difference among the four curves when the speaker is used, there is a difference between the curve corresponding to the position 5 cm away from the front and the other three curves when the speaker unit is used. The difference is more prominent at lower frequencies. On comparison between FIGS. 11 and 12, it can also be seen that the speaker unit pair demonstrates a greater difference between the curve corresponding to the position 2 cm away from the front and the other three curves, than the speaker unit.

As described above, it was confirmed by the experiment that sound emitted from the speaker unit pair according to the invention of the present application is heard only in the vicinity of the speaker unit pair.

First Embodiment

A system that reproduces a sound signal obtained based on a subject to be reproduced is referred to as a sound system. The sound system includes a speaker system in order to emit the sound signal as sound (hereinafter, such sound will be referred to as sound based on a sound signal). Here, the speaker system is a device that converts the sound signal, which is an analog signal, into sound. The subject to be reproduced is, for example, data or a signal from which the sound signal can be obtained through predetermined processing, such as data recorded on a CD, a DVD, or a record, data received over the Internet, or a signal received through radio broadcasting or television broadcasting.

Figure 13:
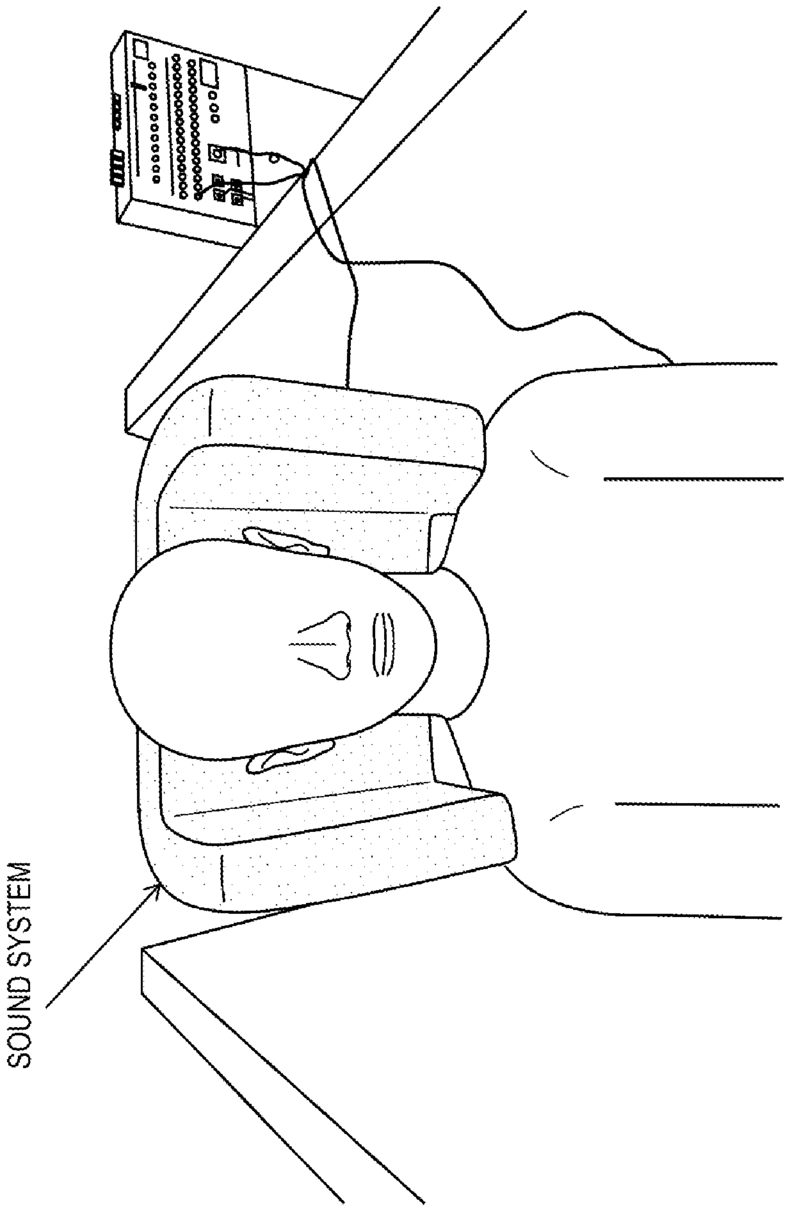
FIG. 13 shows an example of a sound system installed in a seat of an aircraft.

Here, a description will be given of a sound system that reproduces sound based on a sound signal obtained from a subject to be reproduced such that the sound can be heard only by a user who is present in the vicinity of a speaker system. In other words, the sound reproduced by the sound system cannot be heard by other users than the user in the vicinity of the speaker system. If such a sound system is utilized for, for example, a sound system for a user using a seat of an aircraft, a system that allows only the user using the seat to hear reproduced sound can be provided. FIG. 13 shows an example of the sound system installed in a seat of an aircraft. The sound system in FIG. 13 is installed in the seat so as to interpose a head of a user sitting in the seat in between, and is disposed such that two speaker unit pairs are positioned in the vicinities of the right and left ears. Note that such a sound system can also be installed on vehicles other than aircrafts, such as automobiles and trains, and in reclining chairs and the like, and can also be installed in a wearable form to be put on a shoulder or the like. Moreover, a driver unit pair including two driver units arranged side by side, which corresponds to the above-mentioned speaker unit pair, may be installed in each of right and left units of headphones or earphones. The headphones are broadly divided into open-air type and closed type in general, and when the above-described technique is applied particularly to the open-air type, sound leakage from which is a concern, a reduction in leaking sound can be expected.

Figure 14:
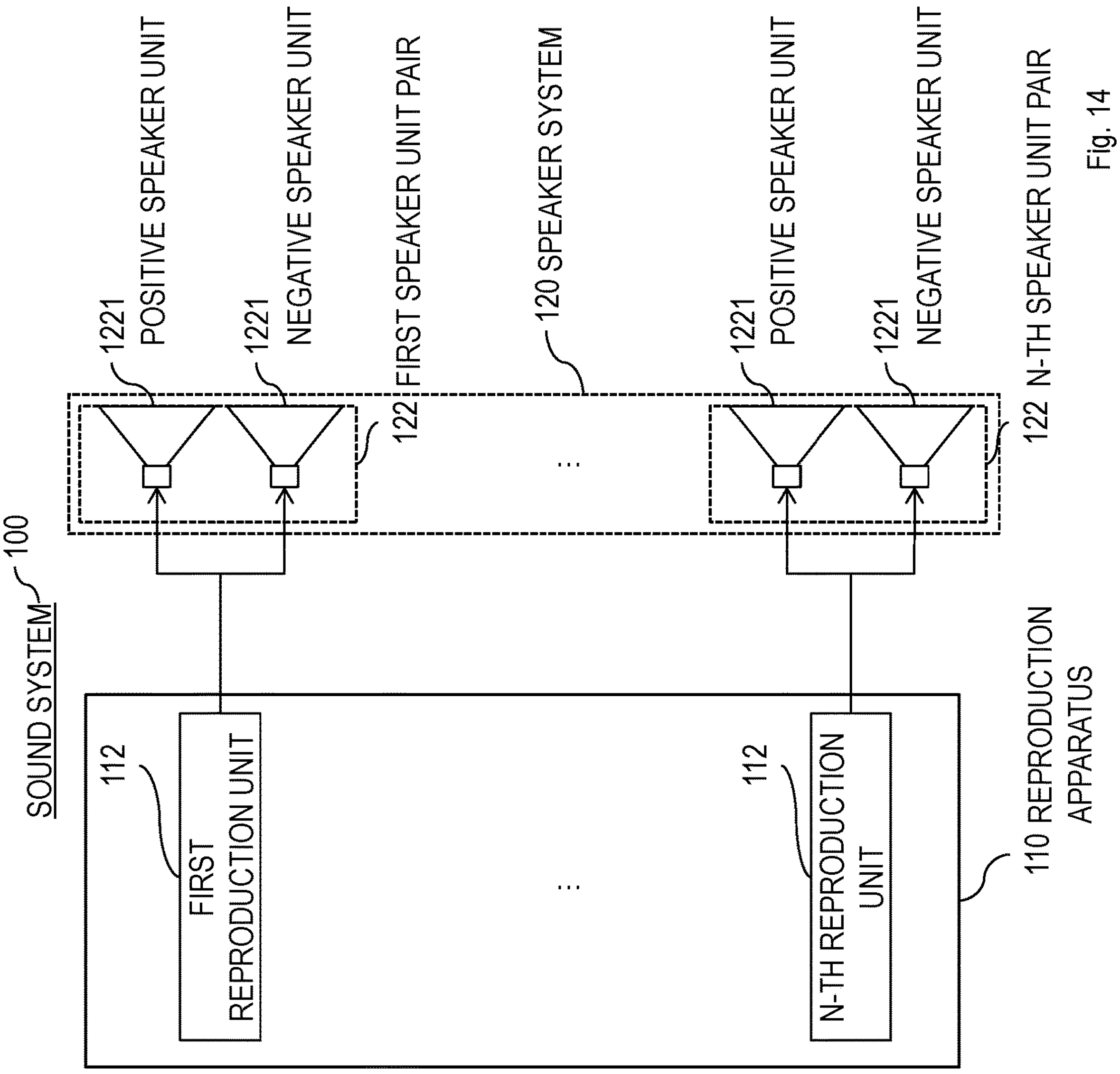
FIG. 14 is a block diagram showing an example of a configuration of a sound system 100.

Hereinafter, a sound system 100 will be described with reference to FIG. 14. FIG. 14 is a block diagram showing a configuration of the sound system 100. As shown in FIG. 14, the sound system 100 includes a reproduction apparatus 110 and a speaker system 120. The reproduction apparatus 110 includes N (N is an integer equal to or larger than one) reproduction units 112 (that is, a first reproduction unit 112, . . . , an N-th reproduction unit 112). The speaker system 120 includes N speaker unit pairs 122 (that is, a first speaker unit pair 122, . . . , an N-th speaker unit pair 122). Each speaker unit pair 122 includes two speaker units (that is, a positive speaker unit 1221 and a negative speaker unit 1221). The negative speaker unit 1221 receives, as an input, a sound signal with opposite phase to that of a sound signal inputted into the positive speaker unit 1221. The speaker system 120 is installed at a place close to a head of a user using the seat.

Note that a direction in which an n-th speaker unit pair 122 faces the user is referred to as an n-th user direction (n=1, . . . , N). The positive speaker unit 1221 and the negative speaker unit 1221 of the n-th speaker unit pair 122 (n=1, . . . , N) are disposed such that sound emitted from the positive speaker unit 1221 in an opposite direction to the n-th user direction and sound emitted from the negative speaker unit 1221 in the opposite direction to the n-th user direction propagate in the n-th user direction due to bending around of the sound. Here, the n-th user direction is a direction toward the front of the positive speaker unit 1221 and the negative speaker unit 1221 of the n-th speaker unit pair 122. The opposite direction to the n-th user direction is a direction toward the rear of the positive speaker unit 1221 and the negative speaker unit 1221 of the n-th speaker unit pair 122.

Moreover, the positive speaker unit 1221 and the negative speaker unit 1221 of the n-th speaker unit pair 122 (n=1, . . . , N) are disposed in a positional relationship in which sound emitted from the positive speaker unit 1221 and sound emitted from the negative speaker unit 1221 cancel each other out so that the sound cannot be heard by users using other seats.

Hereinafter, operation of the sound system 100 will be described, according to FIG. 14.

The reproduction apparatus 110 receives, as inputs, a first sound signal, a third sound signal, . . . , and a (2N−1)-th sound signal that are sound signals obtained based on a subject to be reproduced, and outputs the first sound signal, a second sound signal, . . . , and a 2N-th sound signal. More specifically, an n-th reproduction unit 112 (n=1, . . . , N) receives a (2n−1)-th sound signal as an input, generates, from the (2n−1)-th sound signal, a 2n-th sound signal that is a sound signal with opposite phase to that of the (2n−1)-th sound signal, and outputs the (2n−1)-th sound signal and the 2n-th sound signal. The (2n−1)-th sound signal and the 2n-th sound signal are inputted into the positive speaker unit 1221 and the negative speaker unit 1221 of the n-th speaker unit pair 122, respectively.

The speaker system 120 receives, as inputs, the first sound signal, the second sound signal, . . . , and the 2N-th sound signal outputted by the reproduction apparatus 110, and emits sound based on the first sound signal, sound based on the second sound signal, . . . , and sound based on the 2N-th sound signal. More specifically, the n-th speaker unit pair 122 (n=1, . . . , N) receives the (2n−1)-th sound signal and the 2n-th sound signal as inputs, and emits sound based on the (2n−1)-th sound signal from the positive speaker unit 1221, and emits sound based on the 2n-th sound signal from the negative speaker unit 1221. Since the (2n−1)-th sound signal and the 2n-th sound signal are in an antiphase relationship with each other, sound is heard only in the vicinity of the seat in which the speaker system 120 is installed, as described in the <Technical background> section. For example, when N=2, and assuming that the first sound signal and the third sound signal are sound signals from a right channel and a left channel of a sound source, respectively, stereo sound can be heard only in the vicinity of the seat in which the speaker system 120 is installed.

Note that the sound emitted from the positive speaker unit 1221 of the n-th speaker unit pair 122 in the n-th user direction and the sound emitted from the positive speaker unit 1221 of the n-th speaker unit pair 122 in the opposite direction to the n-th user direction are in an antiphase relationship. Similarly, the sound emitted from the negative speaker unit 1221 of the n-th speaker unit pair 122 in the n-th user direction and the sound emitted from the negative speaker unit 1221 of the n-th speaker unit pair 122 in the opposite direction to the n-th user direction are in an antiphase relationship.

According to the embodiment of the present invention, it is possible to reproduce sound that can be heard only in a very limited small area, that is, the vicinity of a speaker system.

Second Embodiment

The sound system 100 in the first embodiment has a small so-called sweet spot, which is an area where emitted sound is heard. Here, a description will be given of a sound system having a structure that enlarges the sweet spot.

Figure 15:
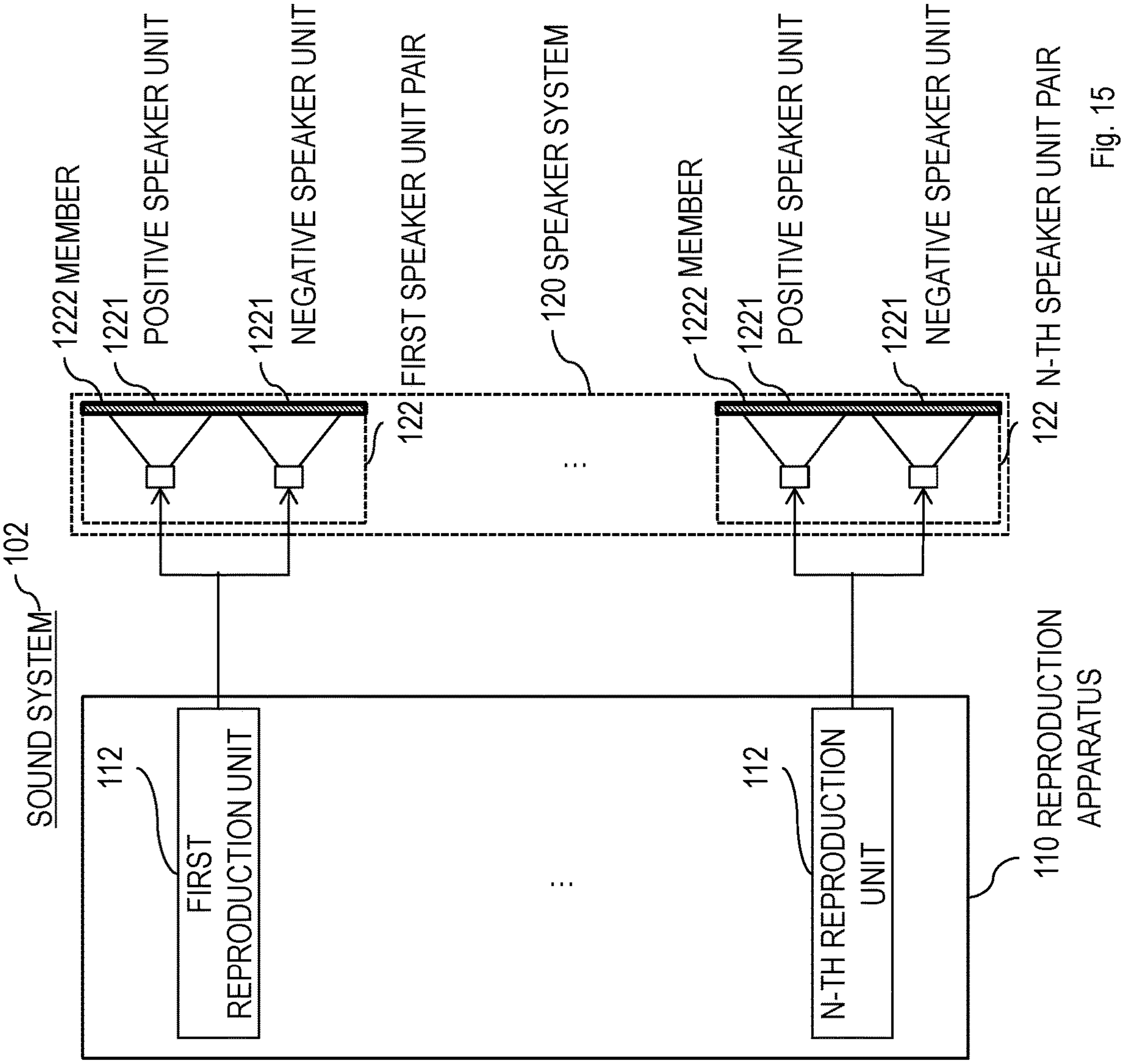
FIG. 15 is a block diagram showing an example of a configuration of a sound system 102.

Hereinafter, the sound system 102 will be described with reference to FIG. 15. FIG. 15 is a block diagram showing a configuration of the sound system 102. As shown in FIG. 15, the sound system 102 includes a reproduction apparatus 110 and a speaker system 120, similarly to the sound system 100. However, the sound system 102 is different from the sound system 100 in a point that a member 1222 is attached to each speaker unit pair 122.

Hereinafter, a structure of an n-th speaker unit pair 122 (n=1, . . . , N) will be described, according to FIG. 15.

Figure 16:
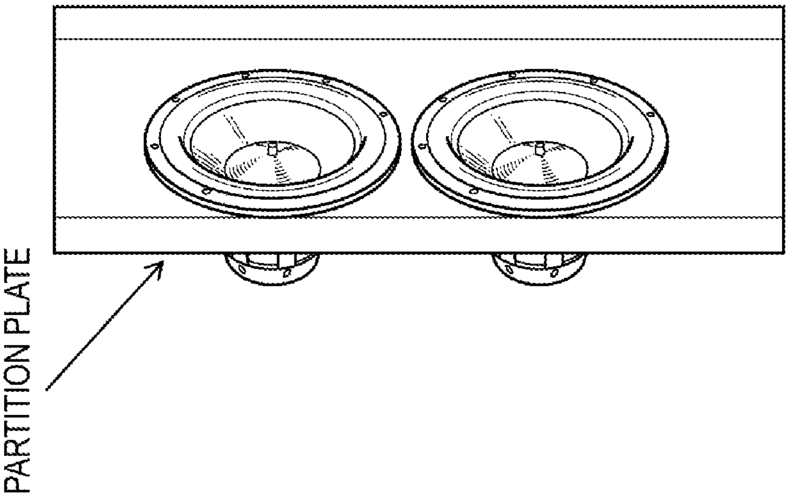
FIG. 16 shows an example of a configuration of a speaker unit pair 122 to which a member 1222 is attached.

The member 1222 is attached to the n-th speaker unit pair 122 (see FIG. 16). The member 1222 is for lengthening a path of sound bending around in the n-th user direction, of sound emitted from a positive speaker unit 1221 and a negative speaker unit 1221 of the n-th speaker unit pair 122 in an opposite direction to the n-th user direction. For example, the member 1222 may be a member such as a partition plate that prevents sound from bending around from the rear of the speaker units. The member 1222 is attached, not to prevent bending around of sound, but to make a phase difference larger between the sound bending around from the rear and sound from the front, that is, to lengthen the path of the sound bending around.

The n-th speaker unit pair 122 to which the member 1222 is attached has a larger sweet spot than the n-th speaker unit pair 122 in the first embodiment.

According to the embodiment of the present invention, it is possible to reproduce sound that can be heard only in a very limited small area, that is, the vicinity of a speaker system.

Third Embodiment

Since high-frequency sound has short wave lengths, phases of sound bending around from the rear and sound from the front do not easily coincide. Accordingly, high-frequency sound has a characteristic of being difficult to cancel, compared to low-frequency sound, in both the vicinity of a speaker unit and other relatively distant places. Since none of the positive speaker units 1221 and the negative speaker units 1221 of the speaker unit pairs 122 included in the sound system 100 in the first embodiment are housed in speaker boxes, the area where high-frequency sound is heard is large due to the above-described characteristic, so that sound leakage may occur in some cases. Accordingly, here, a description will be given of a sound system having a structure that makes it difficult for high-frequency sound to leak into places other than the vicinity of a speaker system.

Figure 17:
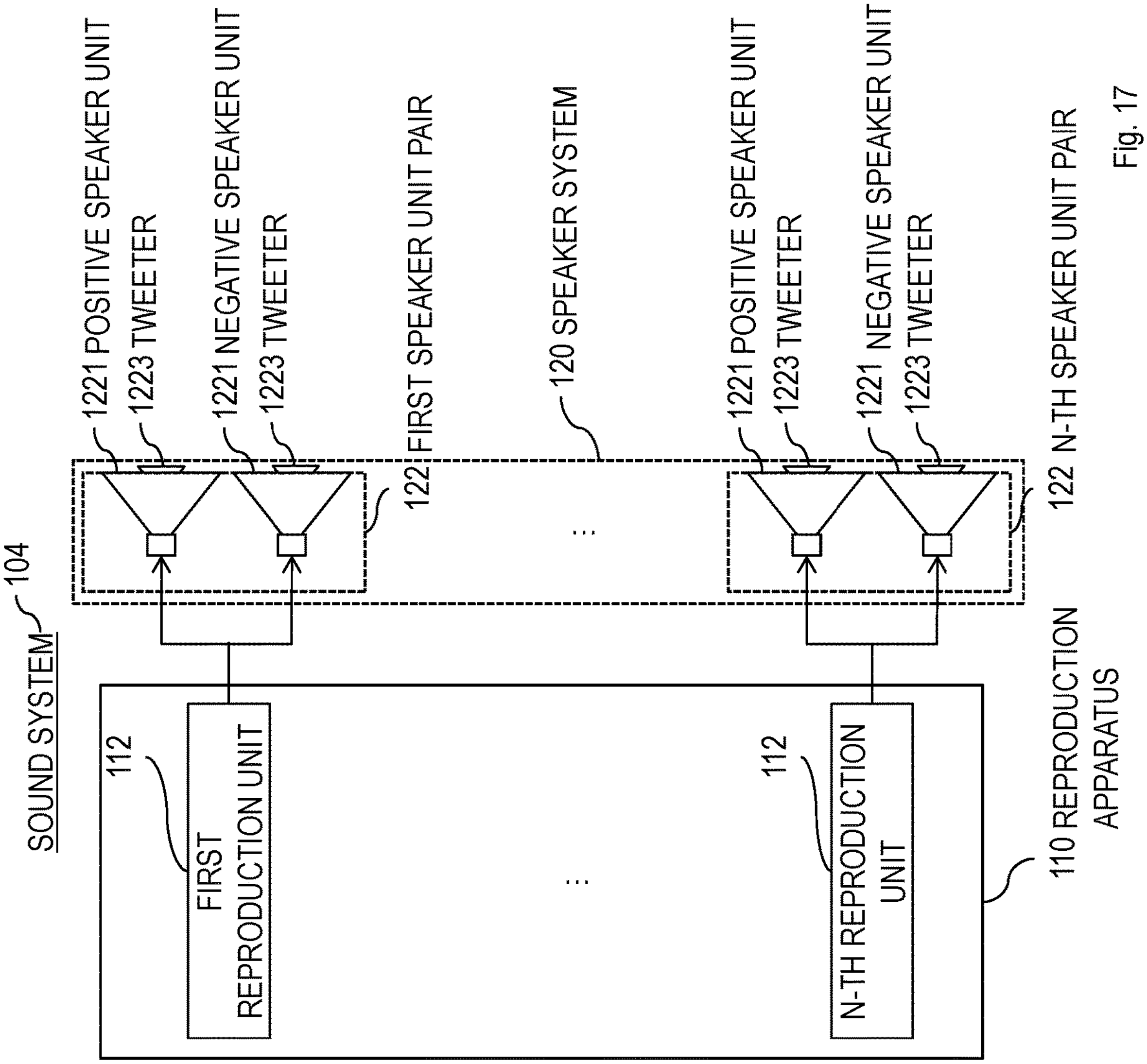
FIG. 17 is a block diagram showing an example of a configuration of a sound system 104.

Hereinafter, the sound system 104 will be described with reference to FIG. 17. FIG. 17 is a block diagram showing a configuration of the sound system 104. As shown in FIG. 17, the sound system 104 includes a reproduction apparatus 110 and a speaker system 120, similarly to the sound system 100. However, the sound system 104 is different from the sound system 100 in a point that a tweeter 1223 is added to each of a positive speaker unit 1221 and a negative speaker unit 1221 of each speaker unit pair 122. Here, the tweeter is a speaker unit for reproducing a signal at high frequencies. Note that the tweeters 1223 are assumed to be added to the positive speaker units 1221 and the negative speaker units 1221 in such a manner that sound from the rear does not leak, as if the tweeters 1223 were housed in speaker boxes.

Hereinafter, operation of the speaker system 120 will be described, according to FIG. 17.

The speaker system 120 receives, as inputs, a first sound signal, a second sound signal, . . . , and a 2N-th sound signal outputted by the reproduction apparatus 110, and emits sound based on the first sound signal, sound based on the second sound signal, . . . , and sound based on the 2N-th sound signal. More specifically, an n-th speaker unit pair 122 (n=1, . . . , N) receives a (2n−1)-th sound signal and a 2n-th sound signal as inputs, and emits sound based on the (2n−1)-th sound signal from the positive speaker unit 1221 and the tweeter 1223 added to the positive speaker unit 1221, and emits sound based on the 2n-th sound signal from the negative speaker unit 1221 and the tweeter 1223 added to the negative speaker unit 1221.

Although higher-frequency sound has higher straightness by nature, a form is made such that sound from the rear of the tweeters 1223 does not leak, and it is therefore possible to prevent high-frequency sound emitted from the tweeters 1223 from leaking in all directions.

According to the embodiment of the present invention, it is possible to reproduce sound that can be heard only in a very limited small area, that is, the vicinity of a speaker system.

Fourth Embodiment

The tweeter is a speaker unit for reproducing a signal at high frequencies. A configuration may be made therefore such that only signals at high frequencies are inputted into tweeters through band division processing. Accordingly, here, a description will be given of a sound system that performs band division processing.

Figure 18:
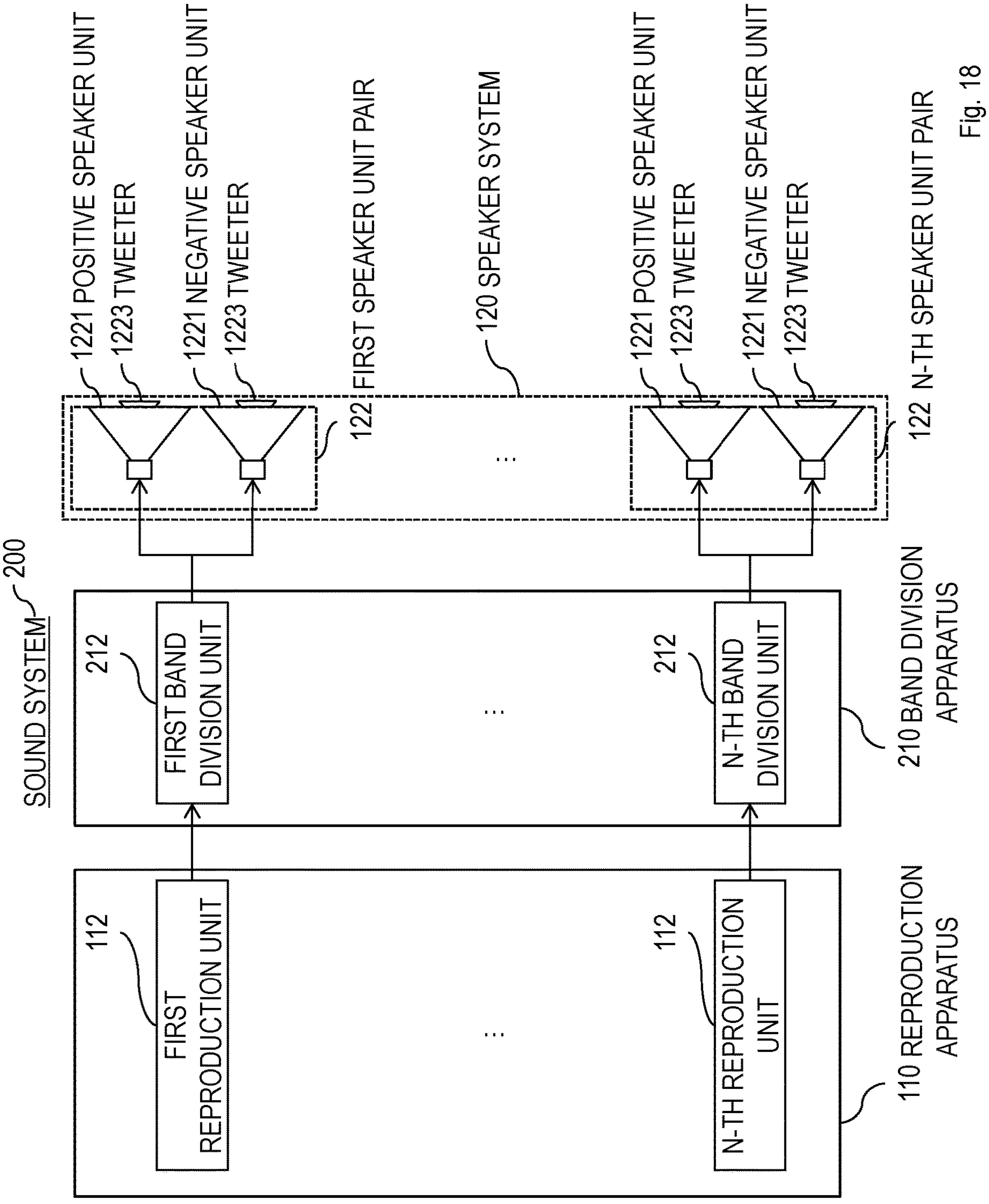
FIG. 18 is a block diagram showing an example of a configuration of a sound system 200.

Hereinafter, the sound system 200 will be described with reference to FIG. 18. FIG. 18 is a block diagram showing a configuration of the sound system 200. As shown in FIG. 18, the sound system 200 includes a reproduction apparatus 110, a band division apparatus 210, and a speaker system 120. The band division apparatus 210 includes N band division units 212 (that is, a first band division unit 212, . . . , an N-th band division unit 212). The sound system 200 is different from the sound system 104 in a point that the band division apparatus 210 is included.

Hereinafter, operation of the band division apparatus 210 and the speaker system 120 will be described, according to FIG. 18.

The band division apparatus 210 receives, as inputs, a first sound signal, a second sound signal, . . . , and a 2N-th sound signal outputted by the reproduction apparatus 110, and outputs a first high-frequency signal and a first low-frequency signal that are a signal at high frequencies and a signal at low frequencies of the first sound signal, respectively, a second high-frequency signal and a second low-frequency signal that are a signal at high frequencies and a signal at low frequencies of the second sound signal, respectively, . . . , and a 2N-th high-frequency signal and a 2N-th low-frequency signal that are a signal at high frequencies and a signal at low frequencies of the 2N-th sound signal. More specifically, an n-th band division unit 212 (n=1, . . . , N) receives a (2n−1)-th sound signal and a 2n-th sound signal as inputs, generates a (2n−1)-th high-frequency signal and a (2n−1)-th low-frequency signal that are a signal at high frequencies and a signal at low frequencies of the (2n−1)-th sound signal, respectively, generates a 2n-th high-frequency signal and a 2n-th low-frequency signal that are a signal at high frequencies and a signal at low frequencies of the 2n-th sound signal, respectively, and outputs the (2n−1)-th high-frequency signal, the (2n−1)-th low-frequency signal, the 2n-th high-frequency signal, and the 2n-th low-frequency signal.

The speaker system 120 receives, as inputs, the first high-frequency signal, the first low-frequency signal, the second high-frequency signal, the second low-frequency signal, . . . , the 2N-th high-frequency signal, and the 2N-th low-frequency signal outputted by the band division apparatus 210, and emits sound based on the first high-frequency signal, sound based on the first low-frequency signal, sound based on the second high-frequency signal, sound based on the second low-frequency signal, . . . , sound based on the 2N-th high-frequency signal, and sound based on the 2N-th low-frequency signal. More specifically, an n-th speaker unit pair 122 (n=1, . . . , N) receives the (2n−1)-th high-frequency signal, the (2n−1)-th low-frequency signal, the 2n-th high-frequency signal, and the 2n-th low-frequency signal as inputs, and emits sound based on the (2n−1)-th low-frequency signal and sound based on the (2n−1)-th high-frequency signal from the positive speaker unit 1221 and the tweeter 1223 added to the positive speaker unit 1221, respectively, and emits sound based on the 2n-th low-frequency signal and sound based on the 2n-th high-frequency signal from the negative speaker unit 1221 and the tweeter 1223 added to the negative speaker unit 1221, respectively.

According to the embodiment of the present invention, it is possible to reproduce sound that can be heard only in a very limited small area, that is, the vicinity of a speaker system.

Fifth Embodiment

In the sound system 200 in the fourth embodiment, speaker units to each of which the tweeter 1223 is added are used for the positive speaker unit 1221 and the negative speaker unit 1221. Here, a description will be given of a sound system that uses speaker unit pairs each including two speaker units and one tweeter, instead of the speaker unit pairs each including two speaker units to which tweeters are added, respectively.

Figure 19:
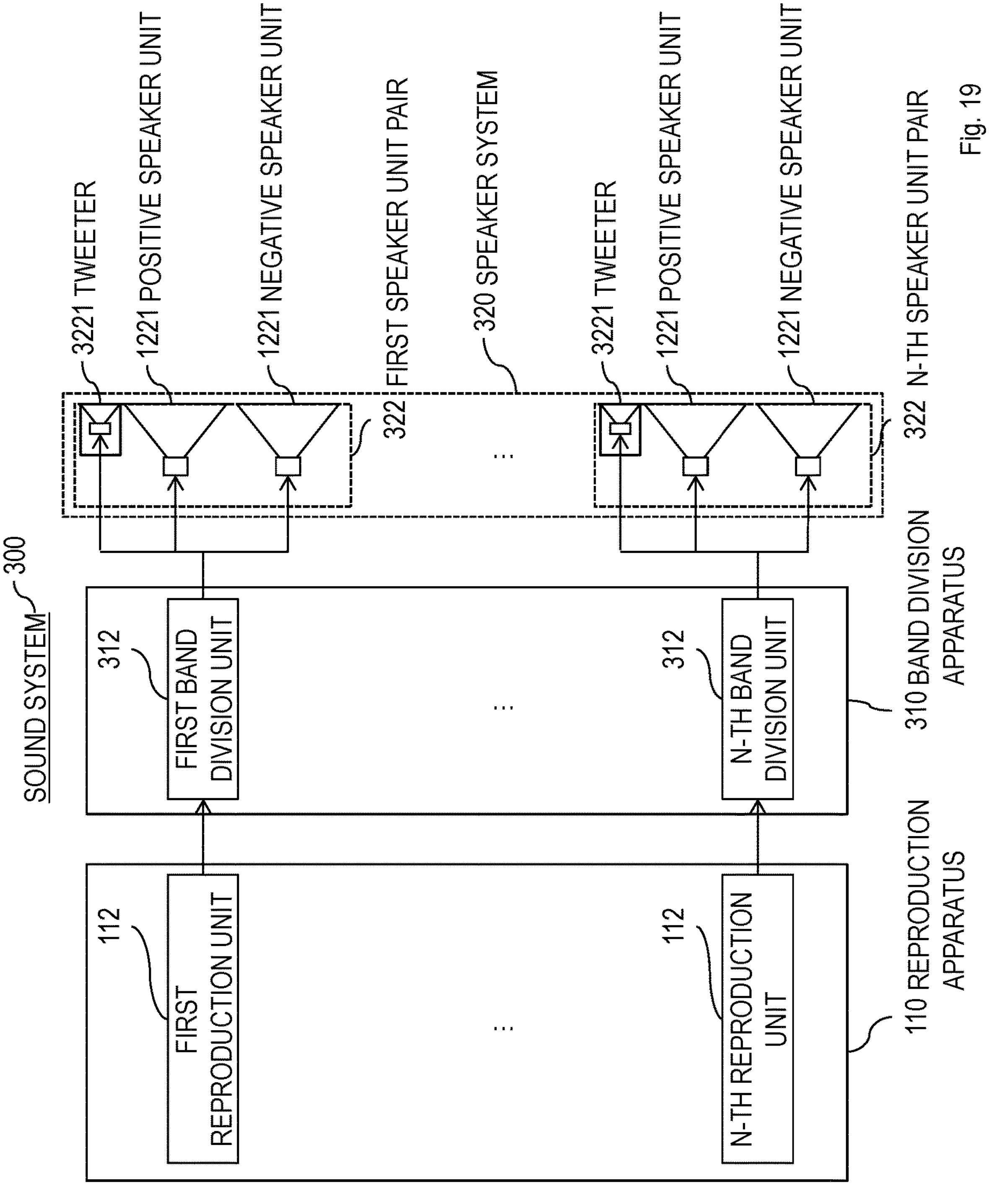
FIG. 19 is a block diagram showing an example of a configuration of a sound system 300.

Hereinafter, the sound system 300 will be described with reference to FIG. 19. FIG. 19 is a block diagram showing a configuration of the sound system 300. As shown in FIG. 19, the sound system 300 includes a reproduction apparatus 110, a band division apparatus 310, and a speaker system 320. The band division apparatus 310 includes N band division units 312 (that is, a first band division unit 312, . . . , an N-th band division unit 312). The speaker system 320 includes N speaker unit pairs 322 (that is, a first speaker unit pair 322, . . . , an N-th speaker unit pair 322). Each speaker unit pair 322 includes two speaker units (that is, a positive speaker unit 1221 and a negative speaker unit 1221) and a tweeter 3221. The sound system 300 is different from the sound system 200 in a point that the band division apparatus 310 and the speaker system 320 are included instead of the band division apparatus 210 and the speaker system 120.

It is preferable that each tweeter 3221 be housed in a speaker box such that sound from the rear does not leak. Moreover, the speaker system 320 is installed at a place close to a head of a user using the seat.

Note that a direction in which an n-th speaker unit pair 322 faces the user is referred to as an n-th user direction (n=1, . . . , N). The positive speaker unit 1221 and the negative speaker unit 1221 of the n-th speaker unit pair 322 (n=1, . . . , N) are disposed such that sound emitted from the positive speaker unit 1221 in an opposite direction to the n-th user direction and sound emitted from the negative speaker unit 1221 in the opposite direction to the n-th user direction propagate in the n-th user direction due to bending around of the sound. Here, the n-th user direction is a direction toward the front of the positive speaker unit 1221, the negative speaker unit 1221, and the tweeter 3221 of the n-th speaker unit pair 322. The opposite direction to the n-th user direction is a direction toward the rear of the positive speaker unit 1221, the negative speaker unit 1221, and the tweeter 3221 of the n-th speaker unit pair 322.

Moreover, the positive speaker unit 1221 and the negative speaker unit 1221 of the n-th speaker unit pair 322 (n=1, . . . , N) are disposed in a positional relationship in which sound emitted from the positive speaker unit 1221 and sound emitted from the negative speaker unit 1221 cancel each other out so that the sound is not heard by users using other seats.

Hereinafter, operation of the band division apparatus 310 and the speaker system 320 will be described, according to FIG. 19.

The band division apparatus 310 receives, as inputs, a first sound signal, a second sound signal, . . . , and a 2N-th sound signal outputted by the reproduction apparatus 110, and outputs a first high-frequency signal and a first low-frequency signal that are a signal at high frequencies and a signal at low frequencies of the first sound signal, respectively, a second low-frequency signal that is a signal at low frequencies of the second sound signal, . . . , a (2N−1)-th high-frequency signal and a (2N−1)-th low-frequency signal that are a signal at high frequencies and a signal at low frequencies of the (2N−1)-th sound signal, respectively, and a 2N-th low-frequency signal that is a signal at low frequencies of the 2N-th sound signal. More specifically, an n-th band division unit 312 (n=1, . . . , N) receives a (2n−1)-th sound signal and a 2n-th sound signal as inputs, generates a (2n−1)-th high-frequency signal and a (2n−1)-th low-frequency signal that are a signal at high frequencies and a signal at low frequencies of the (2n−1)-th sound signal, respectively, generates a 2n-th low-frequency signal that is a signal at low frequencies of the 2n-th sound signal, and outputs the (2n−1)-th high-frequency signal, the (2n−1)-th low-frequency signal, and the 2n-th low-frequency signal.

The speaker system 320 receives, as inputs, the first high-frequency signal, the first low-frequency signal, the second low-frequency signal, . . . , the (2N −1)-th high-frequency signal, the (2N−1)-th low-frequency signal, and the 2N-th low-frequency signal outputted by the band division apparatus 310, and emits sound based on the first high-frequency signal, sound based on the first low-frequency signal, sound based on the second low-frequency signal, . . . , sound based on the (2N−1)-th high-frequency signal, sound based on the (2N−1)-th low-frequency signal, and sound based on the 2N-th low-frequency signal. More specifically, the n-th speaker unit pair 322 (n=1, . . . , N) receives the (2n−1)-th high-frequency signal, the (2n−1)-th low-frequency signal, and the 2n-th low-frequency signal as inputs, and emits sound based on the (2n−1)-th high-frequency signal from the tweeter 3221, emits sound based on the (2n−1)-th low-frequency signal from the positive speaker unit 1221, and emits sound based on the 2n-th low-frequency signal from the negative speaker unit 1221.

According to the embodiment of the present invention, it is possible to reproduce sound that can be heard only in a very limited small area, that is, the vicinity of a speaker system.

Sixth Embodiment

The sound system 104 in the third embodiment is a system that makes it difficult for high-frequency sound to leak by using the speaker units 1221 to which the tweeters 1223 are added, respectively. Here, a description will be given of a sound system that makes it difficult for high-frequency sound to leak by using a member having a sound absorption characteristic, instead of using the speaker units to which the tweeters are added.

Figure 20:
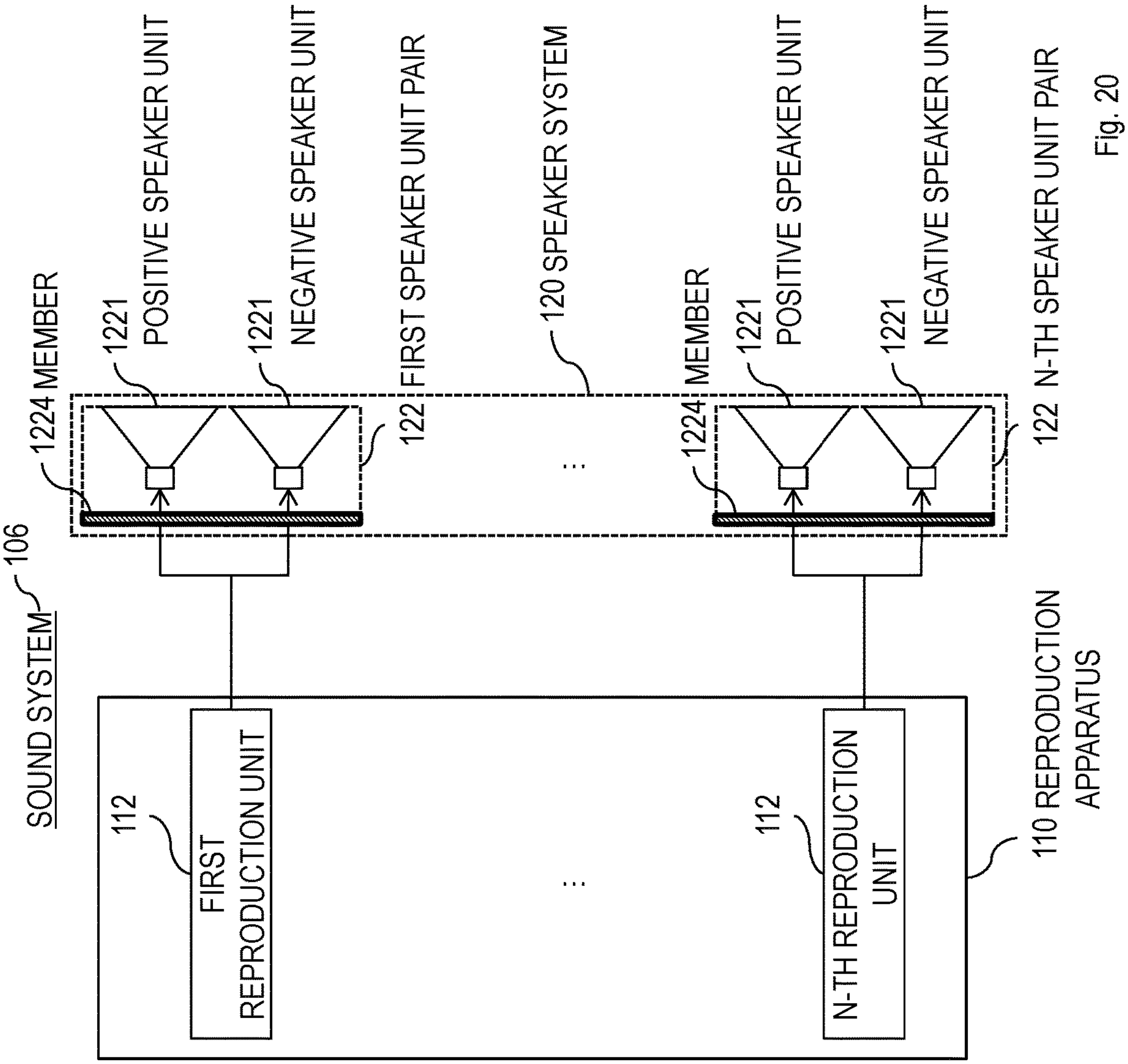
FIG. 20 is a block diagram showing an example of a configuration of a sound system 106.

Hereinafter, the sound system 106 will be described with reference to FIG. 20. FIG. 20 is a block diagram showing a configuration of the sound system 106. As shown in FIG. 20, the sound system 106 includes a reproduction apparatus 110 and a speaker system 120, similarly to the sound system 104. However, the sound system 106 is different from the sound system 104 in points that speaker units 1221 to which no tweeters 1223 are added are used instead of the speaker units 1221 to which the tweeters 1223 are added, and that a member 1224 is attached to each speaker unit pair 122.

Hereinafter, a structure of an n-th speaker unit pair 122 (n=1, . . . , N) will be described, according to FIG. 20.

Figure 21:
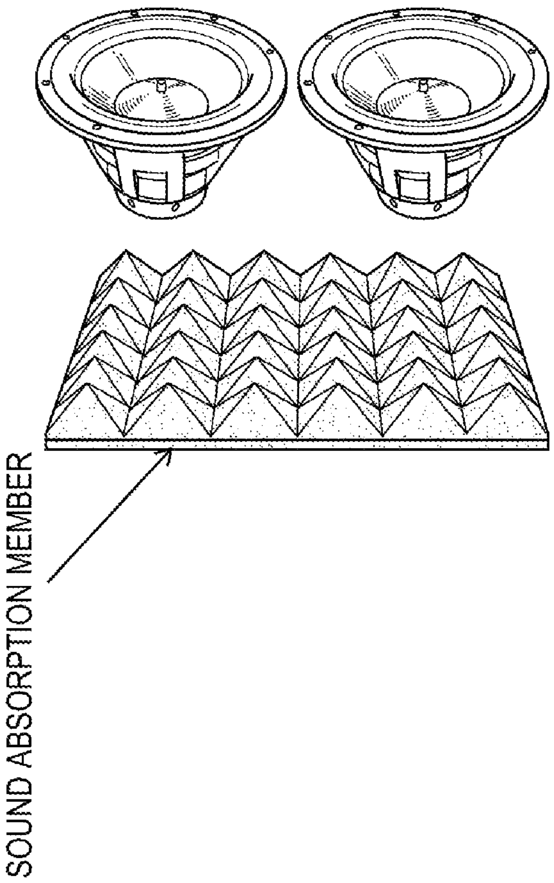
FIG. 21 shows an example of a configuration of the speaker unit pair 122 to which a member 1224 is attached.

The member 1224 is attached to the n-th speaker unit pair 122 (see FIG. 21). The member 1224 is for absorbing sound emitted from a positive speaker unit 1221 and a negative speaker unit 1221 of the n-th speaker unit pair 122 in an opposite direction to an n-th user direction. The member 1224 may be any member that can prevent high-frequency sound from being emitted on the rear. Note that the member 1224 may be installed so as to enclose the speaker unit pair 122 except a front face, instead of being installed only on a rear face of the speaker unit pair 122.

According to the embodiment of the present invention, it is possible to reproduce sound that can be heard only in a very limited small area, that is, the vicinity of a speaker system.

Seventh Embodiment

The sound system 106 in the sixth embodiment is a system that makes it difficult for high-frequency sound to leak by using the speaker units 1221 to which the members 1224 are attached. Here, a description will be given of a sound system that makes it difficult for high-frequency sound to leak by housing each speaker unit of each speaker unit pair in a perforated speaker box, instead of using the speaker unit pairs to which the sound absorption members are attached.

Figure 22:
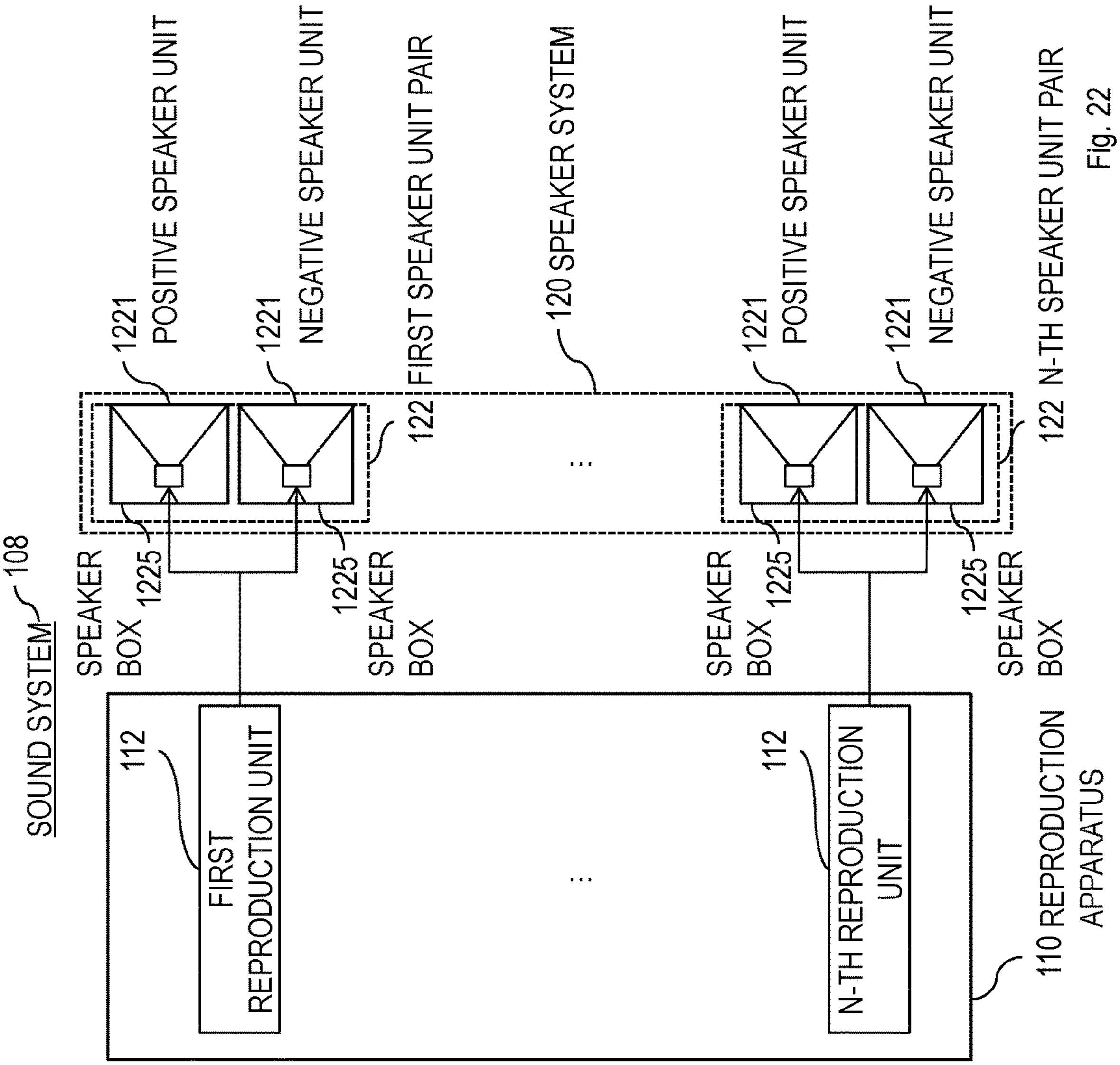
FIG. 22 is a block diagram showing an example of a configuration of a sound system 108.

Hereinafter, the sound system 108 will be described with reference to FIG. 22. FIG. 22 is a block diagram showing a configuration of the sound system 108. As shown in FIG. 22, the sound system 108 includes a reproduction apparatus 110 and a speaker system 120, similarly to the sound system 106. The sound system 108 is different from the sound system 106 in a point that speaker unit pairs 122 each including speaker units 1221 each housed in a speaker box 1225 are included, instead of the speaker unit pairs 122 to which the members 1224 are attached.

Hereinafter, a structure of an n-th speaker unit pair 122 (n=1, . . . , N) will be described, according to FIG. 22.

A positive speaker unit 1221 and a negative speaker unit 1221 of the n-th speaker unit pair 122 are housed in the speaker boxes 1225, respectively. Note that each speaker box 1225 is perforated with many holes.

According to the embodiment of the present invention, it is possible to reproduce sound that can be heard only in a very limited small area, that is, the vicinity of a speaker system.

<Supplement>

The above description of the embodiments of the present invention is provided for illustrative and descriptive purposes. The embodiments are not intended to be exhaustive, or to limit the invention to the exact forms disclosed. Modifications and variations can be made from the above-described teachings. The embodiments are selectively presented in order to provide the best illustrations of the principle of the present invention, and to allow persons skilled in the art to use the present invention in various embodiments, or with addition of various modifications, so that the invention can be adapted to contemplated actual uses. All of such modifications and variations are within the scope of the present invention specified by the accompanying claims that are interpreted according to a justifiably, legitimately, and fairly given range.

2The invention claimed is:

1. A sound system comprising:

a reproduction apparatus including an n-th reproduction unit (n=1, . . . , N) that outputs a (2n−1)-th sound signal that is a sound signal obtained based on a subject to be reproduced, and a 2n-th sound signal that is a sound signal with opposite phase to phase of the (2n−1)-th sound signal, N being an integer equal to or larger than one; and a speaker system including an n-th speaker unit pair (n=1, . . . , N) including a speaker unit that emits sound based on the (2n−1)-th sound signal (hereinafter, referred to as the positive speaker unit) and a speaker unit that emits sound based on the 2n-th sound signal (hereinafter, referred to as the negative speaker unit), the speaker system being installed at a place close to a head of a user, wherein assuming that a direction in which the n-th speaker unit pair faces the user is an n-th user direction (n=1, . . . , N), sound emitted from the positive speaker unit of the n-th speaker unit pair in the n-th user direction and sound emitted from the positive speaker unit of the n-th speaker unit pair in an opposite direction to the n-th user direction are in an antiphase relationship with each other, sound emitted from the negative speaker unit of the n-th speaker unit pair in the n-th user direction and sound emitted from the negative speaker unit of the n-th speaker unit pair in the opposite direction to the n-th user direction are in an antiphase relationship with each other, and the positive speaker unit and the negative speaker unit of the n-th speaker unit pair (n=1, . . . , N) are disposed such that sound emitted from the positive speaker unit in an opposite direction to the n-th user direction and sound emitted from the negative speaker unit in the opposite direction to the n-th user direction propagate in the n-th user direction due to bending around of the sound.

2. The sound system according to claim 1, wherein a member is attached to the n-th speaker unit pair, the member being for lengthening a path of sound bending around in the n-th user direction, of the sound emitted from the positive speaker unit and the negative speaker unit of the n-th speaker unit pair in the opposite direction to the n-th user direction.

3. The sound system according to claim 1, wherein the positive speaker unit and the negative speaker unit of the n-th speaker unit pair (n=1, . . . , N) are speaker units to each of which a tweeter is added, and the tweeter added to the positive speaker unit of the n-th speaker unit pair emits sound based on the (2n−1)-th sound signal, and the tweeter added to the negative speaker unit of the n-th speaker unit pair emits sound based on the 2n-th sound signal.

4. The sound system according to claim 1, wherein a member is attached to the n-th speaker unit pair, the member being for absorbing the sound emitted from the positive speaker unit and the negative speaker unit of the n-th speaker unit pair in the opposite direction to the n-th user direction.

5. The sound system according to claim 1, wherein the positive speaker unit and the negative speaker unit of the n-th speaker unit pair (n=1, . . . , N) are disposed in a positional relationship in which the sound emitted from the positive speaker unit and the sound emitted from the negative speaker unit cancel each other out so that the sound is not heard by another user other than the user.

6. A sound system comprising:

a reproduction apparatus including an n-th reproduction unit (n=1, . . . , N) that outputs a (2n−1)-th sound signal that is a sound signal obtained based on a subject to be reproduced, and a 2n-th sound signal that is a sound signal with opposite phase to phase of the (2n−1)-th sound signal, N being an integer equal to or larger than one;

a band division apparatus including an n-th band division unit (n=1, . . . , N) that generates, from the (2n−1)-th sound signal, a (2n−1)-th high-frequency signal that is a signal at high frequencies and a (2n−1)-th low-frequency signal that is a signal at low frequencies, and generates, from the 2n-th sound signal, a 2n-th high-frequency signal that is a signal at high frequencies and a 2n-th low-frequency signal that is a signal at low frequencies; and a speaker system including an n-th speaker unit pair (n=1, . . . , N) including a speaker unit that emits sound based on the (2n−1)-th low-frequency signal (hereinafter, referred to as the positive speaker unit), a tweeter that is added to the positive speaker unit and emits sound based on the (2n−1)-th high-frequency signal, a speaker unit that emits sound based on the 2n-th low-frequency signal (hereinafter, referred to as the negative speaker unit), and a tweeter that is added to the negative speaker unit and emits sound based on the 2n-th high-frequency signal, the speaker system being installed at a place close to a head of a user, wherein assuming that a direction in which the n-th speaker unit pair faces the user is an n-th user direction (n=1, . . . , N), the positive speaker unit and the negative speaker unit of the n-th speaker unit pair (n=1, . . . , N) are disposed such that sound emitted from the positive speaker unit in an opposite direction to the n-th user direction and sound emitted from the negative speaker unit in the opposite direction to the n-th user direction propagate in the n-th user direction due to bending around of the sound.

7. The sound system according to claim 6, wherein the positive speaker unit and the negative speaker unit of the n-th speaker unit pair (n=1, . . . , N) are disposed in a positional relationship in which the sound emitted from the positive speaker unit and the sound emitted from the negative speaker unit cancel each other out so that the sound is not heard by another user other than the user.

8. A sound system comprising:

a reproduction apparatus including an n-th reproduction unit (n=1, . . . , N) that outputs a (2n−1)-th sound signal that is a sound signal obtained based on a subject to be reproduced, and a 2n-th sound signal that is a sound signal with opposite phase to phase of the (2n−1)-th sound signal, N being an integer equal to or larger than one;

a band division apparatus including an n-th band division unit (n=1, . . . , N) that generates, from the (2n−1)-th sound signal, a (2n−1)-th high-frequency signal that is a signal at high frequencies and a (2n−1)-th low-frequency signal that is a signal at low frequencies, and generates, from the 2n-th sound signal, a 2n-th low-frequency signal that is a signal at low frequencies; and a speaker system including an n-th speaker unit pair (n=1, . . . , N) including a speaker unit that emits sound based on the (2n−1)-th low-frequency signal (hereinafter, referred to as the positive speaker unit), a tweeter that is housed in a speaker box and emits sound based on the (2n−1)-th high-frequency signal, and a speaker unit that emits sound based on the 2n-th low-frequency signal (hereinafter, referred to as the negative speaker unit), the speaker system being installed at a place close to a head of a user, wherein assuming that a direction in which the n-th speaker unit pair faces the user is an n-th user direction (n=1, . . . , N), the positive speaker unit and the negative speaker unit of the n-th speaker unit pair (n=1, . . . , N) are disposed such that sound emitted from the positive speaker unit in an opposite direction to the n-th user direction and sound emitted from the negative speaker unit in the opposite direction to the n-th user direction propagate in the n-th user direction due to bending around of the sound.

9. The sound system according to claim 8, wherein the positive speaker unit and the negative speaker unit of the n-th speaker unit pair (n=1, . . . , N) are disposed in a positional relationship in which the sound emitted from the positive speaker unit and the sound emitted from the negative speaker unit cancel each other out so that the sound is not heard by another user other than the user.

10. A sound system comprising a speaker system that includes at least one speaker unit pair including a speaker unit that emits sound based on a sound signal of a predetermined sound source (hereinafter, referred to as the positive speaker unit) and a speaker unit that emits sound based on a sound signal with opposite phase to phase of the sound signal (hereinafter, referred to as the negative speaker unit), wherein assuming that a direction in which the speaker unit pair faces the user is a user direction, the positive speaker unit and the negative speaker unit of the speaker unit pair are disposed such that sound emitted from the positive speaker unit in an opposite direction to the user direction and sound emitted from the negative speaker unit in the opposite direction to the user direction propagate in the user direction due to bending around of the sound.

11. The sound system according to claim 10, wherein the speaker unit pair is installed at a place close to a head of a user.

12. The sound system according to claim 10, wherein a member is attached to the speaker unit pair, the member being for lengthening a path of sound bending around in a direction toward a user, of sound emitted from the positive speaker unit and the negative speaker unit of the speaker unit pair in an opposite direction to the direction toward the user.

13. The sound system according to claim 10, wherein a member is attached to the speaker unit pair, the member being for absorbing sound emitted from the positive speaker unit and the negative speaker unit of the speaker unit pair in an opposite direction to a direction toward a user.

14. A sound system comprising a speaker system that includes at least one speaker unit pair including a speaker unit that emits sound based on a sound signal of a predetermined sound source (hereinafter, referred to as the positive speaker unit) and a speaker unit that emits sound based on a sound signal with opposite phase to phase of the sound signal (hereinafter, referred to as the negative speaker unit), wherein the sound emitted from the positive speaker unit and the negative speaker unit of the speaker unit pair is made audible only in a vicinity of the speaker unit pair, wherein assuming that a direction in which the speaker unit pair faces the user is a user direction, the positive speaker unit and the negative speaker unit of the speaker unit pair are disposed such that sound emitted from the positive speaker unit in an opposite direction to the user direction and sound emitted from the negative speaker unit in the opposite direction to the user direction propagate in the user direction due to bending around of the sound.

* * * * *